United States Patent [19]

Rosenbaum

[11] Patent Number: 5,404,435
[45] Date of Patent: Apr. 4, 1995

[54] NON-TEXT OBJECT STORAGE AND RETRIEVAL

[75] Inventor: Walter S. Rosenbaum, Bethesda, Md.

[73] Assignee: International Business Machines Corporation, Armonk, N.Y.

[21] Appl. No.: 195,043

[22] Filed: Feb. 14, 1994

Related U.S. Application Data

[63] Continuation of Ser. No. 737,102, Jul. 29, 1991, abandoned.

[51] Int. Cl.⁶ .................................................. G06F 3/03
[52] U.S. Cl. ...................................... 395/147; 395/149
[58] Field of Search ............... 395/144, 145, 146, 147, 395/148, 149

[56] References Cited

U.S. PATENT DOCUMENTS

| | | | |
|---|---|---|---|
| 4,435,779 | 3/1984 | Mayer et al. | 345/203 X |
| 4,604,653 | 8/1986 | Shimizu | 395/145 X |
| 4,641,197 | 2/1987 | Miyagi | 395/145 X |
| 4,811,241 | 3/1989 | Liang | 395/144 X |
| 4,815,029 | 3/1989 | Barker et al. | 395/146 X |
| 4,829,470 | 5/1989 | Wang | 395/147 X |
| 4,933,880 | 6/1990 | Borgendale et al. | 395/147 |
| 4,939,672 | 7/1990 | Meadows | 395/133 |
| 4,941,193 | 7/1990 | Barnsley et al. | 395/136 X |
| 4,967,375 | 10/1990 | Pelham et al. | 395/166 X |
| 4,974,194 | 11/1990 | Barker et al. | 364/419.14 |
| 5,008,853 | 4/1991 | Bly et al. | 395/157 X |

FOREIGN PATENT DOCUMENTS 4157962 8/1990 European Pat. Off. .

OTHER PUBLICATIONS

Gibson, et al., "Set of Algorithms for Defining, Querying, ..." vol. 30, No. 8, Jan. 1988, pp. 123–127, IBM TDB.

Kendrick, et al., "Method for Supporting Non-Text Objects in ..." IBM TDB, vol. 30, No. 8, Jan. 1988, pp. 155–162.

Elliott, et al., "Technique for Retaining, Saving and ..." IBM TDB, vol. 30, No. 8, Jan. 1988, pp. 163–164.

Primary Examiner—Heather R. Herndon
Assistant Examiner—Cliff Nguyen Vo
Attorney, Agent, or Firm—Edward H. Duffield; John E. Hoel

[57] ABSTRACT

The presence of a non-text object is sensed in a mixed object document to be archived in an information retrieval system. In addition to text objects, a mixed object document can contain non-text objects such as image objects, graphics objects, formatted objects, font objects, voice objects, video objects and animation objects. This enables the creation of key words which characterize the non-text object, for incorporation in the inverted file index of the data base, thereby enabling the later retrieval of either the entire document or the independent retrieval of the non-text object through the use of such key words.

79 Claims, 20 Drawing Sheets

Fig 1D  MO:DCA, IOCA, GOCA, and PTOCA Formats
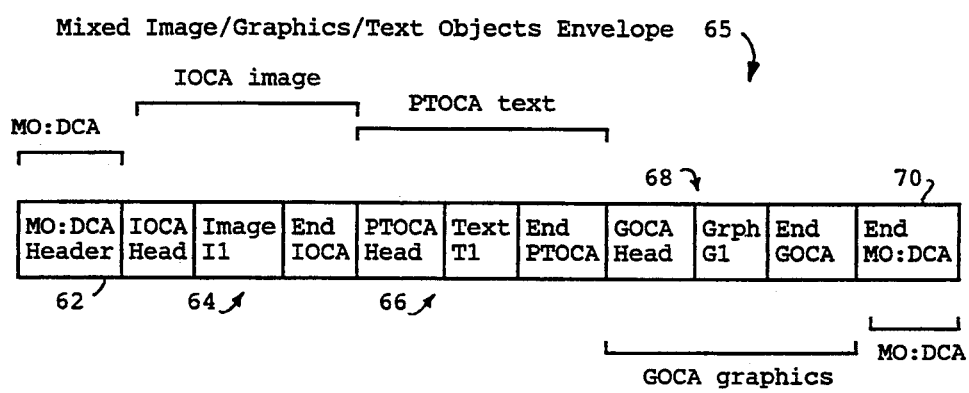
Fig. 1E  Image, Graphics and Text in MO:DCA Envelope
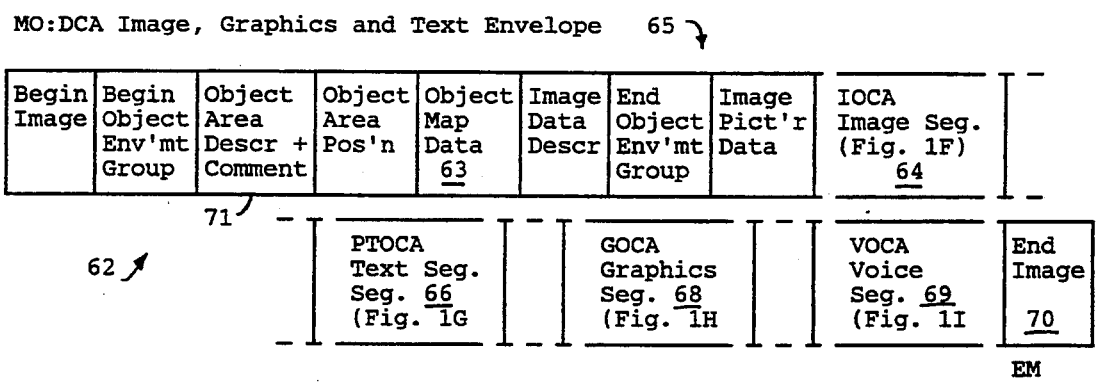

IOCA Image Object 64, I1

PTOCA Text Object 66, T1

GOCA Graphics Object 68, G1

VOCA Voice Object 69, V1

Text T1
> AFRICAN WILDLIFE                                              Page 1
>
> Studies have been conducted over the last decade on the
> changing populations of wildlife around the world.  Inroads
> made by civilization have drastically reduced the habitats
> for indigenous species.  A typical population undergoing such
> changes is that of the elephant.

Bit Mapped Image I1

[bit-mapped image]

Figure 1: African Elephant Family

Text T2
> The elephant is an endangered species.  The members of the
> family Elephantidae are indigenous to both Asia and Africa.
> The African elephant is tall, large-eared mammal of
> tropical Africa.  The Indian elephant is a relatively
> small-eared mammal of the forests of southeast Asia.
> Listen to the sound of an elephant's trumpet.

Page 2

Text T3
> Several international organizations have focused attention on
> the plight of the world's elephant populations.

Graphic G1

[bar chart: Elephants — Asia, Africa, Zoos; Data: Serengeti Foundation Survey]

Figure 2: Worldwide Elephant Population

Text T4
> The above graph has been produced by the Serengeti Foundation
> of Tanzania, based on their comprehensive surveys of wildlife
> parks and zoos around the world.  The graph shows the growth
> of zoo populations for the elephant compared to the growth of
> wild populations in Asia and Africa.

V1 Voice
> [Sound of Elephant]

FIG. 3   Archiving - General Flow Diagram

Step 300:   Load existing index into index buffer (FIG. 5).

Step 302:   Load User's Archiving Options Profile (FIG. 14).

Step 304:   Input Document Architecture Envelope (FIG. 6) and assign it a storage address.

Step 306:   Execute Text Object Archiving Routine (TABLE A)

Step 307:   If selected, Generate Key Words from Text Object Comment Field (TABLE J).

Step 308:   If Text Archiving selected, Generate Key Word for Text Object from Text Object and Link Key Word for Text Object with Text Object.

Step 310:   Execute Image Object Archiving Routine (TABLE B).

Step 312:   If Image Archiving is not selected, then go to Graphics Archiving Routine.

Step 314:   If Manual keyword entry is selected for Image Archiving, then go to Manual routine (TABLE E).

Step 316:   If Highlighted keyword entry is selected for Image Archiving, then go to Highlighting routine (TABLE F).

Step 317:   If selected, Generate Key Words from Image Object Comment Field (TABLE J).

Step 318:   If Automatic Keyword Generation is selected for Image Archiving, Determine from object map, which Text Object is to be the source of key words for the Image Object in the document.

Step 320:   If selected, Generate Key Word for Image Object from Caption in Text Object and Link Key Word for Image Object with Caption in Text Object Step 322:   If selected, Generate Key Word for Image Object from Text Object and Link Key Word for Image Object with Text Object Step 324:   Go to Graphics Object Archiving Routine (TABLE C).

↓

Step 326: If Graphics Archiving is not selected, then go to Voice Archiving Routine (Table I).

↓

Step 328: If Manual keyword entry is selected for Graphics Archiving, then go to Manual Routine (TABLE G).

↓

Step 330: If Highlighted keyword entry is selected for Graphics Archiving, then go to Highlighting Routine (TABLE H).

↓

Step 331: If selected, Generate Key Words from Graphics Object Comment Field (TABLE J).

↓

Step 332: If Automatic Keyword Generation is selected for Graphics Archiving, then Extract Graphics Data (FIG. 11) from Graphics Object in Envelope.

↓

Step 334: If selected, Generate Key Word for Graphics Object from Embedded Text in Graphics Object and Link Key Word (from Embedded Text) for Graphics Object with Text Object.

↓

Step 336: If selected, Generate Key Word for Graphics Object from Caption in Text Object and Link Key Word for Graphics Object with Caption in Text Object.

↓

Step 338: If selected, Generate Key Word for Graphics Object from Text Object and Link Key Word for Graphics Object with Adjacent Object.

↓

Step 340: Execute Voice Object Archiving Routine (TABLE I).

Step 342: If Voice Archiving is not selected, then go to Document Store Routine (Table D).

Step 344: If Manual keyword entry is selected for Voice Archiving, then go to Manual routine (TABLE E).

Step 346: If Highlighted keyword entry is selected for Voice Archiving, then go to Highlighting routine (TABLE F).

Step 347: If selected, Generate Key Words from Voice Object Comment Field (TABLE J).

Step 348: If Automatic Keyword Generation is selected for Voice Archiving, Determine from object map, which Text Object is to be the source of key words for the Voice Object in the document.

Step 350: If selected, Generate Key Word for Voice Object from Caption in Text Object and Link Key Word for Voice Object with Caption in Text Object Step 352: If selected, Generate Key Word for Voice Object from Text Object and Link Key Word for Voice Object with Text Object Step 360: If any more objects in Document envelope to archive, then repeat, Else go to Document Store Routine (TABLE D).

Step 362: Store Document Architecture Envelope at its assigned storage address.

Step 364: If any more documents to archive, repeat.

Step 366: Store Augmented Index including merged key word records.

FIG. 5

| | Index 450 | | | Word Occurrence Entries | | | |
|---|---|---|---|---|---|---|---|
| Keyword = "elephant" | Number Docs = 2 | | | | | | |
| | | Doc ID = 1023 Address FF23 0016 | Number occurs = 10 | Object Type = Text | Object Offset = 1 | Text Link = 7 | T1 |
| | | | | Object Type = Image | Object Offset = 9 | Text Link = 19 | I1 |
| | | | | Object Type = Text | Object Offset = 19 | Text Link = 19 | T2 |
| | | | | Object Type = Text | Object Offset = 19 | Text Link = 21 | T2 |
| | | | | Object Type = Text | Object Offset = 19 | Text Link = 23 | T2 |
| | | | | Object Type = Text | Object Offset = 19 | Text Link = 24 | T2 |
| | | | | Object Type = Text | Object Offset = 31 | Text Link = 32 | T3 |
| | | | | Object Type = Graphics | Object Offset = 34 | Text Link = 52 | G1 |
| | | | | Object Type = Text | Object Offset = 49 | Text Link = 52 | T4 |
| | | | | Object Type = Voice | Object Offset = 54 | Text Link = 26 | V1 |
| | | Doc ID = 0980 Address | Number occurs = 1 | Object Type = Text | Object Offset = 11 | Text Link = 12 | |
| Keyword = "Serengeti" | Numbr Docs = 1 | Doc ID = 1023 Address FF23 0016 | Number occurs = 2 | Object Type = Graphics | Object Offset = 34 | Text Link = 49 | G1 |
| | | | | Object Type = Text | Object Offset = 49 | Text Link = 49 | T4 |

Key Word Record encompasses the whole structure. Document Segment groups entries per Doc ID.

FIG. 6

| MO:DCA Header | map data | PTOCA T1 | IOCA I1 | PTOCA T2 | PTOCA T3 | GOCA G1 | PTOCA T4 | Voice V1 | End MO:DCA |

| MO:DCA Header | map data | PTOCA T1 | PTOCA T2 | PTOCA T3 | PTOCA T4 | IOCA I1 | GOCA G1 | Voice V1 | End MO:DCA |

62'  63'

FIG. 8 - MO:DCA Object Map Data for Same Order of Objects in Data Stream

| Envelope Offset | Object Type/ID | Row ID | Document Offset | Document Page No. | Object Map Data |
|---|---|---|---|---|---|
| 1 | Text ⎡ | 001 | 1 | 1 | 63 |
| 2 | T1 ⎢ |  | 2 |  |  |
| 3 |  | 002 | 3 |  |  |
| 4 |  | 003 | 4 |  |  |
| 5 |  | 004 | 5 |  |  |
| 6 |  | 005 | 6 |  |  |
| 7 |  | 006 | 7 |  |  |
| 8 | ⎣ |  | 8 |  |  |
| 9 | Bit ⎡ | 007 | 9 | 1 |  |
| 10 | Mapped ⎢ |  | 10 |  |  |
| 11 | Image |  | 11 |  |  |
| 12 | I1 |  | 12 |  |  |
| 13 |  |  | 13 |  |  |
| 14 |  |  | 14 |  |  |
| 15 |  |  | 15 |  |  |
| 16 |  |  | 16 |  |  |
| 17 |  |  | 17 |  |  |
| 18 | ⎣ |  | 18 |  |  |
| 19 | ⎡ | 008 | 19 | 1 |  |
| 20 |  |  | 20 |  |  |
| 21 | Text | 009 | 21 |  |  |
| 22 | T2 | 010 | 22 |  |  |
| 23 |  | 011 | 23 |  |  |
| 24 |  | 012 | 24 |  |  |
| 25 |  | 013 | 25 |  |  |
| 26 | ⎣ |  | 26 |  |  |
| 27 |  |  | 27 |  |  |
| 28 |  |  | 28 |  |  |
| 29 |  |  | 29 |  |  |
| 30 |  |  | 30 |  |  |
| 31 | Text ⎡ | 014 | 31 | 2 |  |
| 32 | T3 ⎢ | 015 | 32 |  |  |
| 33 | ⎣ |  | 33 |  |  |
| 34 | ⎡ | 016 | 34 | 2 |  |
| 35 |  |  | 35 |  |  |
| 36 | Graphics |  | 36 |  |  |
| 37 | G1 |  | 37 |  |  |
| 38 |  |  | 38 |  |  |
| 39 |  |  | 39 |  |  |
| 40 |  |  | 40 |  |  |
| 41 |  |  | 41 |  |  |
| 42 |  |  | 42 |  |  |
| 43 |  |  | 43 |  |  |
| 44 |  |  | 44 |  |  |
| 45 |  |  | 45 |  |  |
| 46 | ⎣ |  | 46 |  |  |
| 47 |  |  | 47 |  |  |
| 48 |  |  | 48 |  |  |
| 49 | Text ⎡ | 017 | 49 | 2 |  |
| 50 | T4 ⎢ | 018 | 50 |  |  |
| 51 |  | 019 | 51 |  |  |
| 52 |  | 020 | 52 |  |  |
| 53 | Voice ⎣ | 021 | 53 |  |  |
| 54 | V1 |  | 54 |  |  |

FIG. 9 - MO:DCA Object Map Data for Non-Contiguous Object Data Stream

| Envelope Offset | Object Type/ID | Row ID | Document Offset | Document Page No. | Object Map Data 63' |
|---|---|---|---|---|---|
| 1  | Text  T1 | 001 | 1  | 1 | |
| 2  |    | | 2  | | |
| 3  | | 002 | 3  | | |
| 4  | | 003 | 4  | | |
| 5  | | 004 | 5  | | |
| 6  | | 005 | 6  | | |
| 7  | | 006 | 7  | | |
| 8  | | | 8  | | |
| 9  | | 008 | 19 | 1 | |
| 10 | | | 20 | | |
| 11 | Text  T2 | 009 | 21 | | |
| 12 |    | 010 | 22 | | |
| 13 | | 011 | 23 | | |
| 14 | | 012 | 24 | | |
| 15 | | 013 | 25 | | |
| 16 | | | 26 | | |
| 17 | | | 27 | | |
| 18 | | | 28 | | |
| 19 | | | 29 | | |
| 20 | | | 30 | | |
| 21 | Text  T3 | 014 | 31 | 2 | |
| 22 |    | 015 | 32 | | |
| 23 | | | 33 | | |
| 24 | | | 47 | | |
| 25 | | | 48 | | |
| 26 | Text  T4 | 017 | 49 | 2 | |
| 27 |    | 018 | 50 | | |
| 28 | | 019 | 51 | | |
| 29 | | 020 | 52 | | |
| 30 | | 021 | 53 | | |
| 31 | | | -- | | |
| 32 | Bit Mapped Image I1 | 007 | 9  | 1 | |
| 33 | | | 10 | | |
| 34 | | | 11 | | |
| 35 | | | 12 | | |
| 36 | | | 13 | | |
| 37 | | | 14 | | |
| 38 | | | 15 | | |
| 39 | | | 16 | | |
| 40 | | | 17 | | |
| 41 | | | 18 | | |
| 42 | | 016 | 34 | 2 | |
| 43 | | | 35 | | |
| 44 | Graphics G1 | | 36 | | |
| 45 |     | | 37 | | |
| 46 | | | 38 | | |
| 47 | | | 39 | | |
| 48 | | | 40 | | |
| 49 | | | 41 | | |
| 50 | | | 42 | | |
| 51 | | | 43 | | |
| 52 | | | 44 | | |
| 53 | Voice V1 | | 45 | | |
| 54 |    | | 54 | | |

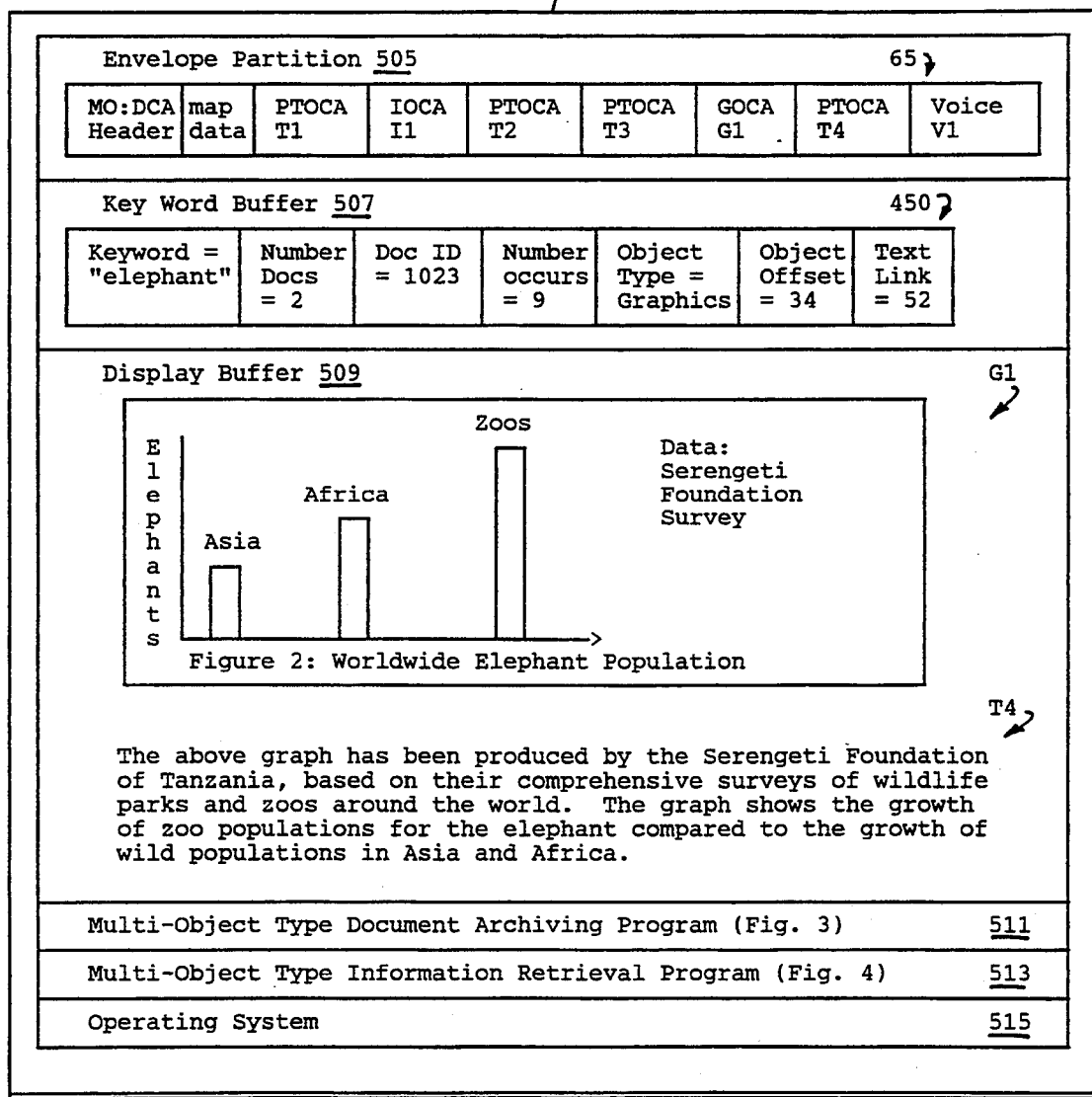
FIG. 10  Workstation for Archiving and Information Retrieval
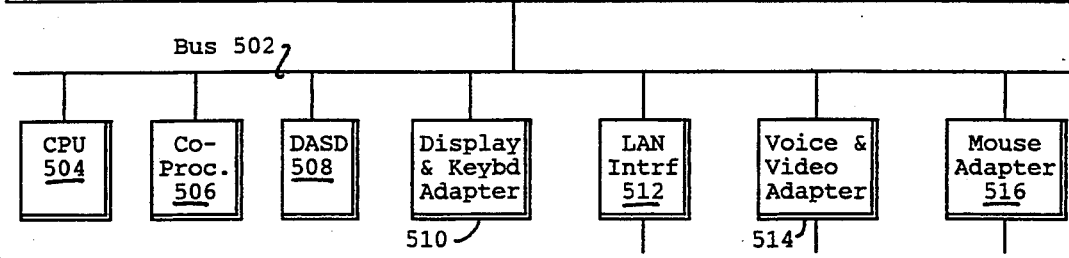

FIG. 11

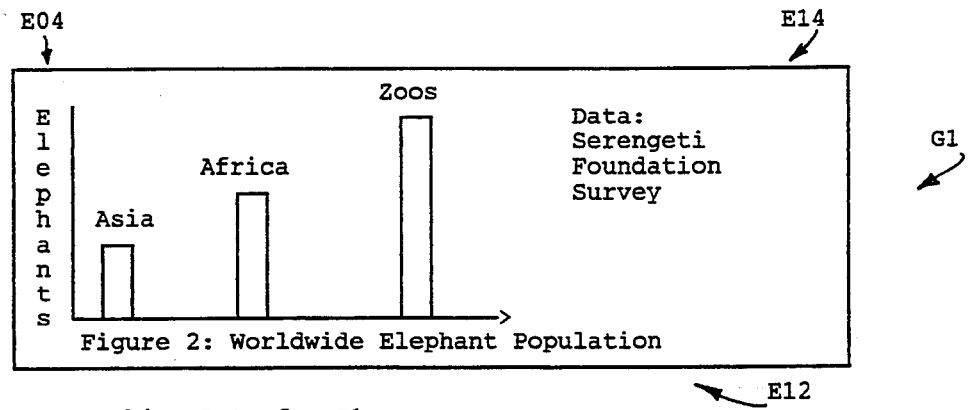

Graphics Data for G1

| ID | element (Row 1, Col 1) to (Row 2, Col 2) |
|---|---|
| E01 | Horizontal Size (5700) |
| E02 | Vertical Size (1300) |
| E03 | Vector (300,500) to (1100,500) |
| E04 | Vertical String (300,300) "Elephants" |
| E05 | Box (800,700) to (1100,900) |
| E06 | Horizontal String (700,700) "Asia" |
| E07 | Vector (1100,500) to (1100,3400) |
| E08 | Box (600,1600) to (1100,1800) |
| E09 | Horizontal String (500,1400) "Africa" |
| E10 | Box (300,2700) to (1100,2900) |
| E11 | Horizontal String (200,2600) "Zoos" |
| E12 | Horizontal String (1200,600) "Figure 2: Worldwide Elephant Population" |
| E13 | Horizontal String (300,3900) "Data:" |
| E14 | Horizontal String (400,3900) "Serengeti" |
| E15 | Horizontal String (500,3900) "Foundation" |
| E16 | Horizontal String (600,3900) "Survey" |

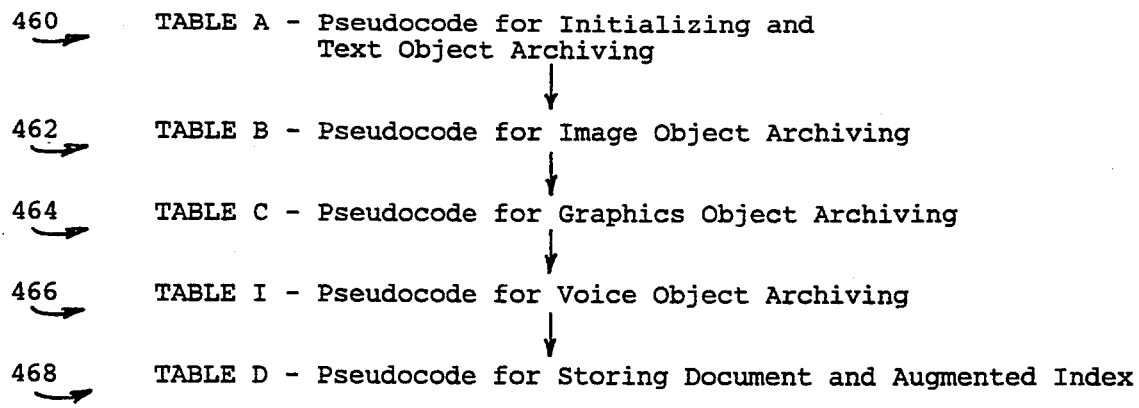
FIG. 12 - Flow Diagram of Pseudocode Tables
460     TABLE A - Pseudocode for Initializing and Text Object Archiving
462     TABLE B - Pseudocode for Image Object Archiving
464     TABLE C - Pseudocode for Graphics Object Archiving
466     TABLE I - Pseudocode for Voice Object Archiving
468     TABLE D - Pseudocode for Storing Document and Augmented Index FIG. 13 - Text Object T2 with Structured Document Tag for Caption
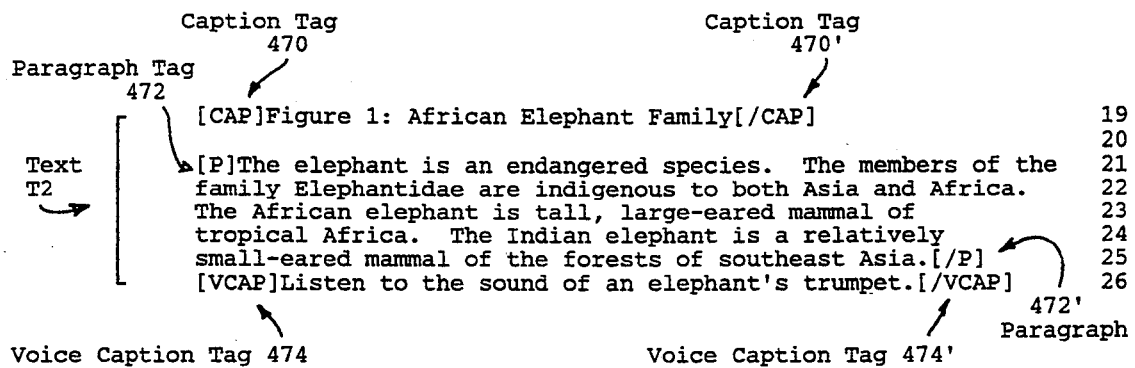

| Archiving Options Profile Menu | |
|---|---|
| Archive Text Objects? | [Y/N] |
| Archive Image Objects? | [Y/N] |
|     Manual Keyword Entry? | [Y/N] |
|     Highlighted Keyword Entry? | [Y/N] |
|     Automatic Keyword Generation? | [Y/N] |
|         From Captions and Labels? | [Y/N] |
|         From Object Comment Field? | [Y/N] |
|         From Adjacent Text Objects? | [Y/N] |
|         From Entire Document Text? | [Y/N] |
| Archive Graphics Objects? | [Y/N] |
|     Manual Keyword Entry? | [Y/N] |
|     Highlighted Keyword Entry? | [Y/N] |
|     Automatic Keyword Generation? | [Y/N] |
|         From Embedded Text? | [Y/N] |
|         From Captions and Labels? | [Y/N] |
|         From Object Comment Field? | [Y/N] |
|         From Adjacent Text Objects? | [Y/N] |
|         From Entire Document Text? | [Y/N] |
| Archive Voice Objects? | [Y/N] |
|     Manual Keyword Entry? | [Y/N] |
|     Highlighted Keyword Entry? | [Y/N] |
|     Automatic Keyword Generation? | [Y/N] |
|         From Captions and Labels? | [Y/N] |
|         From Object Comment Field? | [Y/N] |
|         From Adjacent Text Objects? | [Y/N] |
|         From Entire Document Text? | [Y/N] |

FIG. 15 - Searching Options Profile Menu

| Searching Options Profile Menu | |
|---|---|
| Search Text Objects? | [Y/N] |
| Search Image Objects? | [Y/N] |
| Search Graphics Objects? | [Y/N] |
| Search Voice Objects? | [Y/N] |

490

Fig. 16 - Data for Voice Object
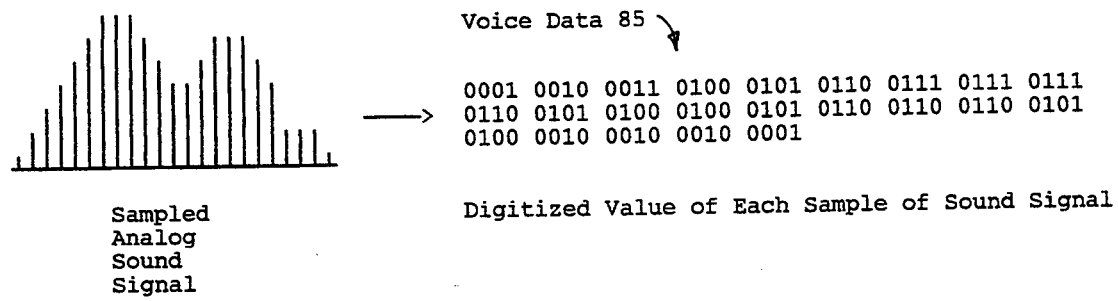
Voice Data 85
0001 0010 0011 0100 0101 0110 0111 0111 0111
0110 0101 0100 0100 0101 0110 0110 0110 0101
0100 0010 0010 0010 0001
Sampled Analog Sound Signal
Digitized Value of Each Sample of Sound Signal
Fig. 17 - Data for Image Object
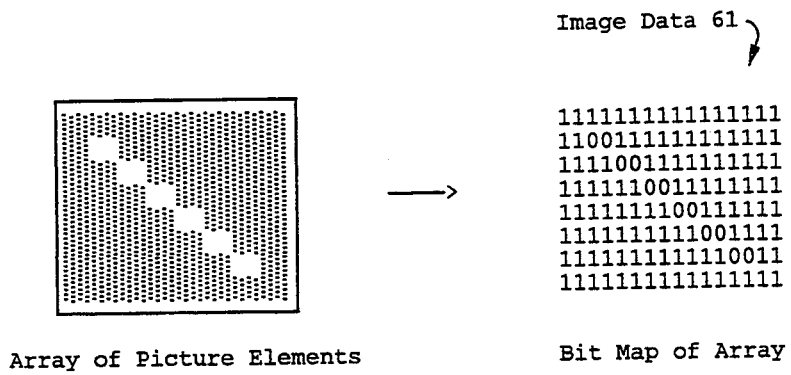
Image Data 61
1111111111111111
1100111111111111
1111001111111111
1111110011111111
1111111100111111
1111111111001111
1111111111110011
1111111111111111
Array of Picture Elements
Bit Map of Array

NON-TEXT OBJECT STORAGE AND RETRIEVAL

This is a continuation of application Ser. No. 07/737,102, filed Jul. 29, 1991, now abandoned.

BACKGROUND OF THE INVENTION

1. Technical Field

The invention disclosed broadly relates to data processing technology and more particularly relates to improvements in information retrieval.

2. Background Art

For the last two decades the retrieval of documents using a computer has been a prominent application in both business and library science. Two methods of preparing and retrieving documents have become established in the state of the art. They are:

Manual Generation of Key Word: At the time of document archival, operator intervention is required to manually attach to the document a set of terms that, in the opinion of the operator, describe the content or theme of the document being stored. The words or phrases may or may not occur within the document and represent a subjective judgement by the operator as to how the document may be queried in the future.

Contextual: Prior to document archival, each word in the document text is reviewed and based on a criterion or set of criteria, words and phrases are chosen as being retrieval terms for the subject document. In its simplest form, each word in the document text can be viewed as a retrieval term. Alternately, elaborate grammatical criteria can be used to scale down the selection of key words from the document text to more specific words which, based on linguistic and information science methodology, are determined to have a greater level of specificity and to be of more use in later retrieval.

An example of the manually generated key word retrieval system is the IBM PROFS System and an example of a contextual system for document text is the IBM STAIRS program product. Both of these are examples of host computer based information retrieval systems. An example of a contextual information retrieval system for document text, which operates on a personal computer or a local area network is the IBM Search Vision product.

The prior art has not provided an efficient means for archiving documents having mixed object types of both text and non-text objects. In the prior art, if an archivist were attempting to archive a document which included images or graphics, the archivist would manually add descriptive terms as key words from his own judgement as to words which most appropriately describe the image or graphic. The prior art has failed to provide a contextual approach to archiving documents having non-text objects. Furthermore, non-text objects contained within a document are not independently accessible in prior art information retrieval systems.

OBJECTS OF THE INVENTION

It is therefore an object of the invention to provide an improved information retrieval system.

It is another object of the invention to provide an improved information retrieval system which is capable of archiving documents containing non-text objects using a contextual method.

It is still a further object of the invention to provide an information retrieval system which enables the independent accessing of non-text objects from documents archived in the system.

It is still a further object of the invention to provide an information retrieval system capable of accessing documents containing non-text objects, using a query term which matches to a key word which was derived solely from the non-text object.

SUMMARY OF THE INVENTION

These and other objects, features and advantages are accomplished by the non-text object storage and retrieval invention disclosed herein. A program, method and system are disclosed which senses the presence of a non-text object in a mixed object, multimedia document to be archived in an information retrieval system. In addition to text objects, a mixed object document can contain non-text objects such as image objects, graphics objects, formatted data objects, font objects, voice objects, video objects and animation objects. The invention enables the creation of key words which characterize the non-text object, for incorporation in the inverted file index of the data base, thereby enabling the later retrieval of either the entire document or the independent retrieval of the non-text object through the use of such key words. Three different approaches are described for creating the key words for the non-text objects. The first method is by presenting to the archivist the non-text object within the context of the descriptive text of the document. The archivist may then input key words through the keyboard and by pointing to the object with a mouse, for example, associating those key words with the non-text object in the document. Later, when the inverted file index is prepared, the key word, the document's storage address and the location of the non-text object within the document are associated with one another. In this manner, during later retrieval where the key word is the query term, not only can the entire document be accessed, but the non-text object can be independently accessed and displayed.

A second method for creating key words employs the display to the archivist of the non-text object within the context of the text of the document. The archivist is provided with a pointing device to highlight or mark those portions of the text in the document which relate to the non-text object. The pointing device is also employed to identify the non-text object to which the highlighted text refers. Then, in a manner similar to the first method, the highlighted portions of the text have the highlighted words used as key words which are associated with the storage address of the document and with the non-text object, in the formation of the inverted file index. Then later, during an information retrieval session, not only can the document be retrieved by the use of such key words, but also the non-text object can be independently retrieved and displayed.

A third method for the formation of key words for non-text objects is by automatic key word extraction. There are several types of non-text objects, such as image, graphics, formatted data, fonts, voice, video, and animation objects. An image object is a bit mapped image which typically contains an array of picture elements or pels which may or may not be compressed when stored in the data base. Usually, there is no text contained within a bit mapped image, however text may be associated with the bit mapped image in an architected data stream such as a Mixed Object Document Content Architecture (MO:DCA) data stream or alternately an Office Document Architecture (ODA) data stream. A second type of non-text object is a graphics object wherein a two-dimensional picture is represented by a set of vector representations of straight lines, arcs and other graphical elements. In a graphic object, text can be contained in embedded alphanumeric strings which are treated in the same manner as are the vector elements within the graphics object. In accordance with the invention, where the non-text object is an image object, a voice object, or other non-text object, the architected data stream will often have an associated text structure which is related as a caption, a label, or a comment field for example, to the non-text object. The method of the invention searches for the related text caption, and uses the alphanumeric string representing the caption as the key words which are associated with the non-text object in the preparation of the inverted file index, as described above. If the non-text object is a graphics object, a formatted data object, or other non-text object, containing embedded alphanumeric strings, then in accordance with the invention, any embedded alphanumeric strings such as captions, graph labels, worksheet labels, embedded comments and the like are searched for and extracted to form the key words used in the formation of the inverted file index. Those key words, as was described above, are associated with the particular non-text object so that later, during an information retrieval stage, the use of such key words as query terms will access not only the document, but the independent non-text object with which the key word was associated.

BRIEF DESCRIPTION OF THE DRAWINGS

These and other objects, features and advantages can be more fully appreciated with reference to the accompanying figures.

FIG. 1D illustrates MO:DCA, IOCA, GOCA, VOCA and PTOCA object formats.

FIG. 1E is a more detailed illustration of a MO:DCA architected data stream envelope.

FIG. 2 depicts the physical document which is represented by an architected data stream such as that in FIG. 1A, which includes four types of objects, text, image, graphics and voice.

FIG. 3 is a flow diagram of the archiving of document having multiple object types, in accordance with the invention.

FIG. 5 illustrates a portion of an index for a data base containing documents having multiple objects, for looking up documents and independently accessing objects within those documents in a data base.

FIG. 6 is a MO:DCA architected data stream envelope which includes map data, and includes various objects which appear in the physical document represented in FIG. 2.

FIG. 7 is an alternate form of the MO:DCA architected data stream of FIG. 6, wherein the text objects are clustered in a contiguous position within the envelope followed by the non-text objects, FIG. 8 is a MO:DCA object map data 63 for the envelope of FIG. 6.

FIG. 9 is a alternate MO:DCA object map data 63' for the envelope of FIG. 7.

FIG. 10 is an illustration of an example workstation for archiving and information retrieval of multi-object documents, in accordance with the invention.

FIG. 11 illustrates the graphics appearance and the graphics data 75 for the graphics object G1.

FIG. 12 is a high level flow diagram of the pseudo-code tables for archiving a multi-object document.

FIG. 13 is an example of the text object T2 as expressed with structured document architecture tags including a caption tag and a voice caption tag.

FIG. 14 depicts the archiving options profile menu, in accordance with the invention.

FIG. 15 depicts the searching options profile menu, in accordance with the invention.

FIG. 16 depicts the generation and organization of voice data for a voice object.

FIG. 17 depicts the generation and organization of an image data for an image object.

DISCUSSION OF THE PREFERRED EMBODIMENT

Figure 1A:
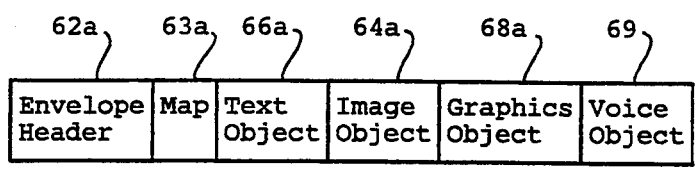
FIG. 1A is a first type of architected data stream envelope which describes a multi-object document, including an image object, graphics object and voice object.

Modern, multi-media documents can be composed of several types of data objects. Text objects are characterized by strings of alphanumeric characters. Image objects are characterized by arrays of picture elements (pels) which form a bit map. Bit maps can be compressed and otherwise processed to make them more compact or compatible, but they represent the picture elements of a pictorial scene. Graphics objects are visual representations of geometric shapes which can be expressed with formulas, such as straight lines, boxes, arcs, and graphics objects can include embedded text strings of alphanumeric characters whose location is defined within the area represented by the graphics object. Formatted data objects are still another form of representation of a visual object, wherein an array of alphanumeric strings is represented by the object, such as a spreadsheet. In addition to conventional document objects, other types of non-text objects can include voice objects, video objects, and animation objects. A voice object is an object in multi-media document which will provide a sound. A voice object will include sampled, digitized signals for the sound enveloped in an object architecture similar to other types of document objects. A voice object represents rasterized video signals which are suitable for display on a television monitor and which can be stored in conjunction with digitized sound signals for a complete television audio and picture representation. Animation objects are still another form of a non-text object which provide the information necessary to link in a sequence other image objects and/or other graphics objects to enable the performance of an animated display. These are examples of non-text document objects in a multimedia document.

Document objects are organized in an architected data stream envelope. There are several conventional architected data stream envelopes. An architecture is a convention for organizing document objects suitable for interchange between applications which are established and adhered to by international organizations or by consortia of manufacturers. An example is the Office Document Architecture (ODA) which is described in the International Standard ISO8613 (1988). The ODA architected data stream is capable of supporting multiple types of objects, both text and non-text objects, as previously described. Another architected data stream is the Mixed Object Document Content Architecture (MO:DCA) architecture which is described for example in the publication "Mixed Object Document Content Architecture Reference," SC31-6802, IBM Corporation, available through IBM branch offices. The MO:DCA environment is used to described documents that are interchanged among data processing systems where each document can consist of one or more pages containing image objects, text objects, graphics objects, and other non-text objects such as voice and video. Data arrays are also supported by the MO:DCA architected data stream.

Image objects are represented by Image Object Content Architecture (IOCA) which is described in the IBM publication SC31-6805. Graphics objects are represented by the Graphics Object Content Architecture (GOCA) which is described in the IBM publication SC31-6804. Formatted Data Object Architecture (FDOCA) is described in the IBM publication SC31-6806. Text objects are represented by the Presentation Text Object Content Architecture (PTOCA) described in the IBM publication SC31-6803.

Figure 1B:
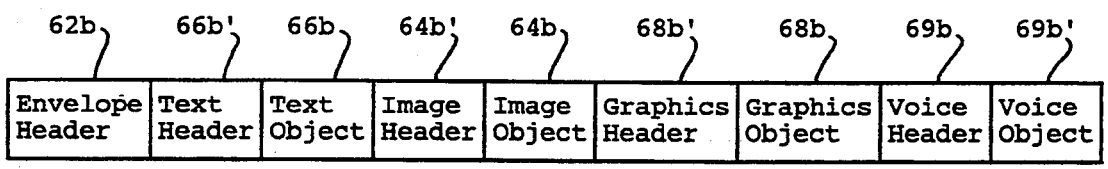
FIG. 1B is a second type architected data stream which describes a multi-object document.

The architected data stream of FIG. 1A can be a MO:DCA data stream, an Office Document Architecture data stream or other suitable architected data stream. The envelope of the architected data stream in FIG. 1A is characterized by an object map data 63a which specifies the displacement of the particular object location with respect to the header 62a of the envelope 65a. The map 63a includes information on the location of the text object 66a, image object 64a, graphics object 68a and voice object 69a. An alternate format for an architected data stream is shown in FIG. 1B where the envelope 65b includes the same representative examples of objects, a text object 66b, image object 64b, graphics object 68b and voice object 69b, however there is no centralized object map data field. Instead, each object is preceded by a header which characterizes the object type, such as the text header 66b', image header 64b', graphics header 68b' and voice header 69b'. When the architected data stream envelope 65b is processed, an initial scan is made of the envelope to determine the presence of the various object headers and a dynamic compilation of an object map data 63 is prepared in order to identify the location of each of the respective objects with respect to the envelope header 62b.

Figure 1C:
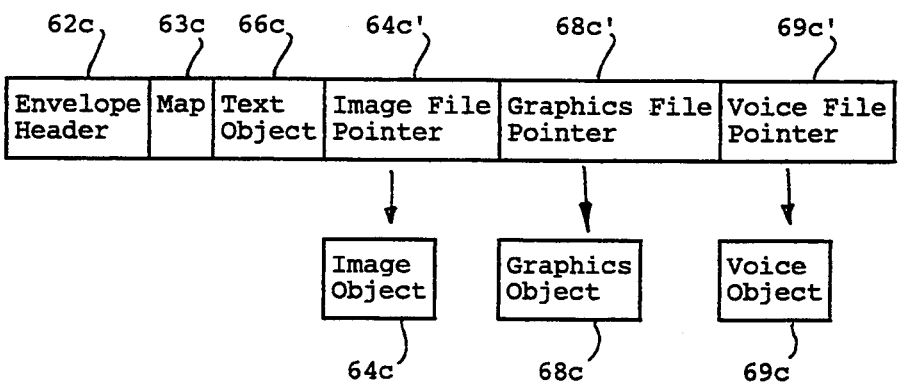
FIG. 1C is a third type architected data stream which describes a multi-object document.

Still another form of architected data stream is shown in FIG. 1C wherein the envelope 65c includes the same type of objects, however some or all of the objects may have all or part of their data stored in an independent file which is pointed to by a file pointer contained within the architected data stream envelope. For example, the image file pointer 64c' contained within the architected data stream envelope 64c, will have a pointer address which is directed to the image object file 64c which is independently stored in the system. In a similar manner, the graphics file pointer 68c' will point to an independently stored graphics object 68c. In a similar vein, the voice file pointer 69c' will point to a voice object file which is independently stored as voice object 69c. In this manner, not only can larger objects be related to a particular architected data stream, but the content of the objects can be changed by changing the independently stored object file. Each of the architected data streams, 65a, 65b and 65c shown in FIGS. 1A-1C can represent a multi-object document having multi-media representations. The multi-media representations can include, in addition to the visual text, image and graphics representations, other non-text objects and representations such as voice, video and animation.

Figure 1F:
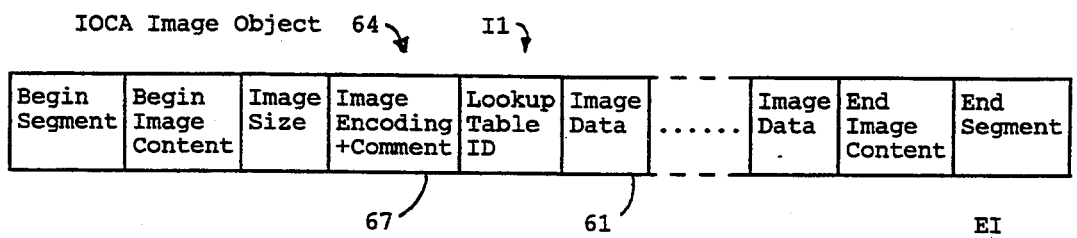
FIG. 1F describes an IOCA image object.
Figure 1G:
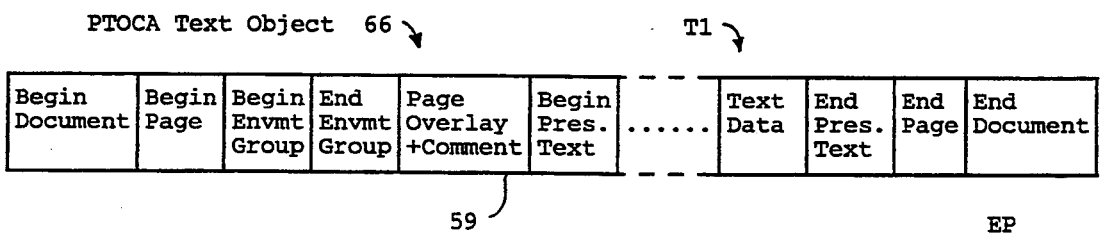
FIG. 1G describes a PTOCA text object.

Reference to FIG. 1D will illustrate a mixed object document content architected data stream 65 (MO:DCA) which includes an IOCA image object, a PTOCA text object and a GOCA graphics object. Reference to FIG. 1E will give a more detailed representation of a MO:DCA architected data stream and shows where the IOCA, PTOCA and GOCA segments and a VOCA voice segment can be located with respect to the header 62 for the data stream. Reference to FIG. 1F will show the format for an IOCA image object 64, reference to FIG. 1G will show a format for a PTOCA text object 66, reference to FIG. 1H will show a representation of the format for a GOCA graphics object 68 and reference to FIG. 1I will show a representation of a VOCA voice object 69 which is compatible with the MO:DCA architected data stream envelope.

FIG. 2 depicts a physical document which is represented by a MO:DCA architected data stream such as is shown in FIG. 6. The document of FIG. 2 is a multi-media document which includes four different types of objects, text objects T1, T2, T3 and T4; an image object I1, a graphics object G1, and a voice object V1. FIG. 8 illustrates a MO:DCA object map data set 63 for the MO:DCA architected data stream 65 of FIG. 6 which represents the location of the various objects which represent the physical document of FIG. 2. The object map data of FIG. 8 corresponds to the sequence of objects as depicted in FIG. 6 which is T1, I1, T2, T3, G1, T4 and V1, respectively. In an alternate arrangement of objects in the MO:DCA envelope 64' of FIG. 7, the text objects are clustered in a contiguous manner as is shown with T1-T4 then followed by the non-text objects I1, G1 and V1. The map data 63' for this arrangement is shown in FIG. 9.

FIG. 11 is a depiction of the graphics object G1 and its corresponding graphics data 75. The graphics data 75 includes the closed form arithmetic expressions for each of the respective geometric elements of the graphics object G1. For example, elements E01 and E02 indicate the overall size of the graphics object G1. The element E03 is the vertical vector corresponding to the abscissa of the graph which is depicted in the graphics object G1. The element E05 is the box shape which is characterized by its upper left-hand and lower right-hand vertices. In particular, the embedded text strings which are alphanumeric strings contained within the graphics object G1, are also included in the graphics data 75. The word "Elephants" is represented by the element E04 which is a vertical string starting at the location 300,300. The horizontal string "FIG. 2: Worldwide Elephant Population" is represented by the graphic element E12 which begins at the location 1200,600.

FIG. 13 is a depiction of the text object T2 which is represented by a structured document architecture such as the Standard Generalized Markup Language (SGML) which is described in detail in the International Standard ISO8879 (1986). Of particular significance in FIG. 13 is the use of caption tags 470 and 470' to indicate an alphanumeric string used as the caption for an adjacent bit mapped image I1. Also of significance in FIG. 13 are voice caption tags 474 and 474' which identify an alphanumeric string which is associated with the voice object V1.

In accordance with the invention, a generalized flow diagram of the process for archiving a multi-object document which includes non-text objects, is shown in FIG. 3. The process of FIG. 3 will be applied to an example document such as the document of FIG. 2 which is represented by the architected data stream of FIG. 6. The result of the operation of process of FIG. 2 will be the formation of the multi-object data base index 450 of FIG. 5 which will enable the independent accessing of both text and non-text objects from archived documents.

Associated with the flow diagram of FIG. 3 is the pseudocode representing a program suitable for execution on a data processor such as that depicted in FIG. 10. The pseudocode for the archiving program can be found in Tables A–J contained in this specification. The flow diagram of FIG. 3 begins with step 300 which loads the existing index 450 into the index buffer of the workstation 500 in FIG. 10. Then in step 302, the user's archiving option profile in FIG. 14 is loaded. Reference to FIG. 14 will show the profile 480 which offers the archivist the options of archiving text objects, graphics objects, image objects and voice objects. For non-text objects, options are offered for manual key word entry, highlighted key word entry, or automatic key word generation. For those non-text objects such as a graphics object which may have embedded text, the option is offered of generating the key word from the embedded text in the object. Alternate options include the generation of a key word from captions, labels, comments, or other text objects. Then in step 304 of FIG. 3, the document architecture envelope of FIG. 6 is input and a storage address is assigned to it. The document architecture envelope 65 includes the text objects T1, T2, T3 and T4, the image object I1, the graphics object G1 and the voice object V1, which represent the corresponding portions of the document 200 shown in FIG. 2. If object map data 63 is provided in the document architecture envelope 65, then it is used to locate the various objects in the envelope 65. Alternately, if a format is used such as that shown in FIG. 1B where there is no centralized object map data, then an initial scan is made through the envelope 65 to locate the characteristic headers for each of the corresponding objects, and an object map data is dynamically generated. Then in step 306 of FIG. 3, the text object archiving routine is executed, as is set forth in the pseudocode of Table A. In step 307, if selected from a profile such as FIG. 14, key words can be generated from any comment field 59 of the text object 66, as is set forth in the pseudocode of Table J. Then in step 308, if text archiving has been selected, a key word is generated for the text object from that text object and the key word is linked for the text object with that text object. For example, with reference to the text object T1 of FIG. 2, each of the words in the text object is processed as a source for a potential key word to be included in the index 450 of FIG. 5. For example, the word "elephants" is located in line 7 of the text object T1 and, in accordance with the invention, a word occurrence entry is made in the document segment of the key word record for the key word elephant, in FIG. 5. This identifies the object type as "text," and identifies the offset location for the object as beginning at line 1. The text link for the particular occurrence of the word "elephant" is identified as line 7. The values used for offsets can be location coordinates which are referenced with respect to the beginning of the data stream envelope 65, the beginning of the object within the envelope, or at the beginning of the document or page represented by the object. It is the objective to provide a coordinate value which, when the index is accessed during a query operation, will provide the coordinates adequate independently access the object from the document for display.

The flow diagram of FIG. 3 then proceeds to step 310 in which the image object archiving routine is executed in accordance with the pseudocode of Table B. If image archiving has not been selected in the archiving profile of FIG. 14, then the flow diagram goes to the graphics archiving routine, at step 324. Then in step 314, if a manual key word entry has been selected for image archiving, then the flow proceeds to the manual routine at Table E. In step 316, if highlighted key word entry is selected for image archiving, then the flow goes to the highlighting routine of Table F. In step 317, if selected from the profile of FIG. 14, key words can be generated from comment field 68 of IOCA object 64, as is set forth in the pseudocode of Table J. Then in step 318, if automatic key word generation is selected for image archiving, then it is determined from the object map data which text object in the data stream envelope is to be the source of key words for the image object in the document. In step 320 of FIG. 3, if selected, the key word is generated for the image object from the caption in the text object and a link is generated for the key word for the image object with the caption in the text object. Reference is made to the pseudocode of Table B where in step 1240, a word string is extracted from the caption in the adjacent text object to the image object. The object map data of FIG. 8 shows that the text object T1 is adjacent to and above the image object I1 and the text object T2 is adjacent and below the image object I1. The text object T2 is selected for and searched for a caption word string for the image object I1. Reference is made to FIG. 13 which shows the text object T2 with structured document tags identifying the caption word string. The caption tag 470 and caption tag 470' identify the word string "FIG. 1: African Elephant Family" as a caption string. Since this string is adjacent to the image object I1, it is processed as the source of key words to be attributed to the image object I1. Turning to Table B, the step 1240 extracts the word string "Elephant" from the caption in the text object T2. Then in step 1242, if the word is not present in the existing index 450, then a new key word record is opened in the key word buffer. In step 1244, if the word string is present in the existing index 450, then the existing key word record for the word is loaded into the key word buffer. Turning to FIG. 5, the key word "elephant" already exists in the index 450 and therefore a new key word record need not be opened, but the existing key word record from the index 450 is loaded into the key word buffer. Then in step 1246 of Table B, if the word string has not been previously processed for this document, then the quantity indicating the number of documents in the key word record is incremented by unity. In this case, the quantity indicating the number of documents is incremented to a value of 2 in FIG. 5. Next in Table B, step 1248 determines if the word string was not previously processed for this document, a new document segment should be opened in the key word record and the document ID and its envelope storage address should be recorded. Referring to FIG. 5, the key word record has an existing opened document segment for the current document (which was opened when previously processing text object T1) whose document ID is given a value of 1023 and whose bulk storage address is assigned as "FF23 0016." Then in step 1250 of the Table B, the number of occurrences of the word in the document is incremented by unity in the field of the document segment. In this case since this is the second occurrence of the word "elephant" found in the current document, the number of occurrences is incremented from one to two. Then next in step 1252 of Table B, a word occurrence entry is opened in the document segment of the key word record for the key word "elephant" and the object type is entered as an "image" object. Then in step 1254, the object offset of the image object in the envelope 65 is entered into the word occurrence entry. Referring to the object data map of FIG. 8, the object offset is identified as the ninth line for the image object I1 and therefore this value is entered into the word occurrence entry of the document segment for the key word record. Then, in step 1256 of Table B, the word offset in the envelope of the word in the caption is entered into the text link field of the word occurrence entry for the document segment in the key word record. In this case, the text link is the word "elephant" which occurs in the caption at line 19 which occurred in the text object T2. Therefore, the text link offset value of 19 is entered in the word occurrence entry.

The object offset value in the word occurrence entry will enable a user who has entered the query term "elephant" to independently access the image object I1 for display. The availability of the text link value 19 in the word occurrence entry enables the user to actuate a function key and display related text from a text object, for example the caption string from the text object T2.

Then in Table B, step 1258 determines if there are any more occurrences of the same word string in the caption text of the text object and if there are, the routine returns to step 1250 for further processing. Alternately, in step 1259, if there are no more occurrences of the word string, the key word record for the word "elephant" is merged back into the index 456. Then in step 1260, if there are any additional words in the caption text string of the text object, the routine returns to step 1240 for further processing. Alternately, in step 1261, if there are no further words in the caption text string, then the routine proceeds to step 1275 which goes on to graphics object archiving routine of Table C.

Returning to the flow diagram of FIG. 3, step 324 goes to the graphics object archiving routine of Table C. In step 326, if graphics archiving is not selected, then the routine goes on to the voice archiving routine of Table I. Alternately, if in step 328, if manual key word entry is selected for graphics archiving, then the flow goes to the manual routine of Table G. Then in step 330, if highlighted key word entry is selected for graphics archiving, the flow goes to the highlighting routine of Table H. In step 331, if selected from the profile of FIG. 14, key words can be generated from the comment field 77 of GOCA object 68, as is set forth in the pseudocode of Table J. Then in step 332, if automatic key word generation is selected for graphics archiving, then the graphics data of FIG. 11 is extracted from the graphics object in the envelope.

Reference is made here to Table C for the pseudocode describing the graphics archiving. In step 1283, the graphics data of FIG. 11 is extracted from the graphics object in the envelope. FIG. 11 shows the graphics object G1 and the graphics data 75 for the graphics object G1. Sixteen elements from E01–E16 are shown in the graphics data 75. Elements E01 and E02 represent the horizontal and vertical size of the graphics object G1. Element E03 represents a vertical vector forming the abscissa of the graph depicted in the graphics object G1. The vector is characterized by its beginning and ending coordinates within the area defined by the size elements E01 and E02. The graphics element E04 is a vertical string beginning at the coordinates 300,300 with the alphanumeric characters "Elephants" which is arranged adjacent to the abscissa of the graph shown in the graphics object G1. The element E05 is a box element whose shape is represented by the coordinates of its upper left-hand and lower right-hand vertices. Other alphanumeric strings are embedded in the graphics object G1 and are represented by corresponding string descriptions in the graphics data 75. In step 1284 of Table C, a search is conducted in the graphics data 75 for embedded text strings. In step 1285, if there is an embedded text string in the graphics object, then the flow proceeds to step 1286. In step 1286, a word string is extracted from the embedded text in the graphics object. For example, the word string "elephants" can be extracted. In step 1287, if the word string is not present in the existing index 450 of FIG. 5, then a new key word record is opened in the key word buffer. Alternately, in step 1288, if the word string is present in the existing index, then the key word record for the word string is loaded into the key word buffer. In this case, since the key word "elephant" already exists in the index 450, its key word record is loaded into the key word buffer. Then in step 1289, if the word string was not previously processed for this document, then the number of documents is incremented in the key word record. In this case, the word "elephant" has already been processed in the text objects T1, T2 and T3 and in the image object I1 for this document, and therefore the number of documents field is not incremented. Then in step 1290, if the word was not previously processed for this document, then a new document segment is opened in the key word record. However, in this example since the word "elephant" has already been processed for previous occurrences in this document, the existing document segment is used.

Next in step 1291, the number of occurrences of the word in the document is incremented in the document segment. In this case, since the word "elephant" has already been processed seven times for this document, the value is incremented from seven to eight for the processing of the occurrence of the word "elephant" as an embedded text string in the graphics object G1. Then next in step 1292, a word occurrence entry is opened in the document segment of the key word record and the object type is entered in as a "graphics" object. Then in step 1293, the object offset for the graphics object G1 in its envelope 65 is entered in the word occurrence entry. In this case, since the graphics object G1 begins at line 34 as is shown in the object map data of FIG. 8, the value of 34 is entered as the object offset value in the word occurrence entry.

Next, the key word is linked from the embedded text with a text object elsewhere in the document. In step 1306, it is determined from the object map data of FIG. 8 which text object is adjacent to and below the graphics object in the document. Then in step 1308, the text object below the graphics object, in this case the text object T4, is extracted and its contents are searched for the word string from the embedded text found in the graphics object. Then in step 1312, the word offset in the envelope of the word in the text object below and adjacent to the graphics object, is entered into the text length field of the word occurrence entry for the graphics object. In this manner, during a query operation when a user wishes to access graphics objects, using the key word "elephant," the graphics object G1 will be independently accessed and presented for display to the user. The user may then optionally actuate a function key to review related text in a text object, the text link value stored in the word occurrence entry will be used to access the text object T4 and in particular the line in the text object T4 where the key word occurs, in this case the word "elephant" occurring at line 52, the value stored in the word occurrence entry.

Returning to the flow diagram of FIG. 3, step 334 generates the key word from the embedded text of the graphics object and links it with the text object. Step 336 will generate a key word for the graphics object from a caption in a separate text object and will link the key word for the graphics object with the caption in the text object. In step 338, the key word is generated for the graphics object from the whole text of a selected text object and the key word is linked for the graphics object with the adjacent text object.

After processing has been completed for archiving graphics objects in the document, the flow diagram of FIG. 3 proceeds to step 340 to execute the voice object archiving routing of Table I. Step 2200 of Table I locates the voice object V1 in the envelope 65 using the object map data of FIG. 8. If there is no voice object or if voice archiving is not selected, then the flow proceeds to step 2280. In step 2235, if manual key word entry is selected, then the flow goes to Table E. In step 2236, if highlighted key word entry is selected, then the flow goes to Table F. Also in step 2236, if selected from the profile of FIG. 14, key words can be generated from the comment field 87 of the voice object 69, as is set forth in the pseudocode of Table J. In step 2237, if automatic key word generation is selected for voice object archiving, then the object map of FIG. 8 is examined to determine which text object is related to the voice object in the document. In this example, the text object T2 which is shown in FIG. 13, has structured document tags for the voice caption. The voice caption tags 474 and 474' identify the string "Listen to the sound of an elephant's trumpet." as the text string which is to serve as the caption for the voice object V1. Since the text object T2 has the closest proximity to the voice object V1 for text objects containing voice captions, the text object T2 is selected as the text object for generation of the key word associated with the voice object V1. Then in step 350 of the flow diagram of FIG. 3, the key word is generated for the voice object from the caption in the text object and a link is generated for the key word for the voice object with the caption in the text object. Turning to Table I for the pseudocode for voice object archiving, step 2240 extracts a word string from the caption in the text object. The word string in this example is the word "elephant." The form of the word appearing in the caption of the text object T2 is the possessive "elephant's." Morphological analysis can be applied, as is described for example in the copending patent application by Richard Carlgren, et al., Ser. No. 299,181, filed Jan. 19, 1989 entitled "Method for Use of Morphological Information to Construct a Data Base," assigned to the IBM Corporation and incorporated herein by reference, which describes a technique for identifying the base word or lemma such as the word "elephant" from morphological equivalents of the word, such as the possessive form "elephant's."

Then in step 2242 of Table I, if the word is not present in the existing index, a new key word record is opened in the key word buffer. In step 2244, if the word is present in the existing index, then the key word record is loaded into the key word buffer. In this example, since the key word record for the word "elephant" already exists in the index, it is loaded into the key word buffer. Then in step 2246, if the word has not been previously processed for this document, the number of documents field is incremented by one. However, in this example, the word "elephant" has been previously identified nine times in the current document so the number of documents is not incremented and for step 2248, the current document segment will be used for the key word record. Then in step 2250, the number of occurrences of the word in the document is incremented from nine to ten. Then in step 2252, a word occurrence entry is opened in the document segment of the key word record and the object type is entered as "voice" object. Then in step 2254, the object offset is entered for the voice object in the envelope into the word occurrence entry. Since the location of the voice object V1 is at line 54 in the object map of FIG. 8, the offset value of 54 is entered into the word occurrence entry of the document segment.

Then in step 2256, the word offset of the word in the caption in the text object T2 is entered into the text link field of the word occurrence entry. In this example, since the word occurs in a caption of the text object T2 at line 26, the text length value of 26 is entered into the word occurrence entry. Then in step 2258, if any more occurrences of the word appear in the caption text string of the text object, the flow returns to step 2250. Then in step 2259, the key word record is merged with the existing index. Then in step 2260, if any additional words appear in the caption text string of the text object, the flow returns to step 2240. Then in step 2261, the flow proceeds to step 2275.

Returning now to the flow diagram of FIG. 3, in step 352, if selected, a key word is generated for the voice object from other text objects in the document. Then in step 360, if any more objects in the document envelope need to be archived, then the flow proceeds to step 306. Alternately, if archiving operations for the current document are complete, then the flow proceeds to step 362 for storing the document architecture envelope at its assigned storage address. Then in step 364, it is determined if there are any more documents to archive and if so, the flow proceeds to step 304. Alternately, at step 366 the archiving operation is drawing to a close with the storage of the augmented index which includes the merged key word records.

Figure 1H:
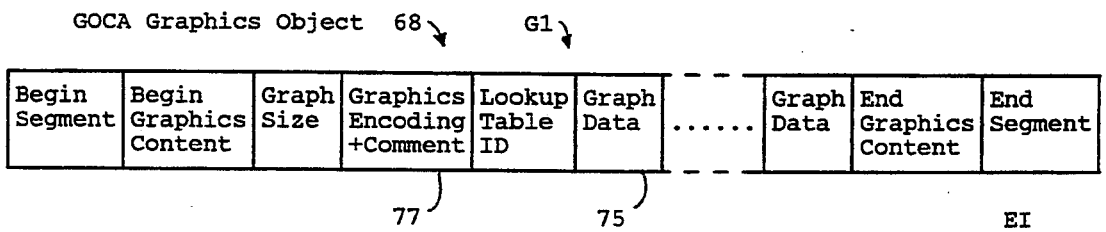
FIG. 1H describes a GOCA graphics objects.
Figure 1I:
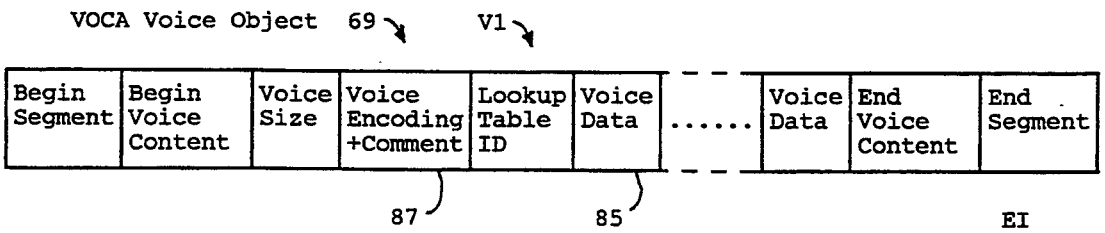
FIG. 1I describes a VOCA voice object.

Non-text object architectures such as the image object architecture at FIG. 1F, the graphics object architecture of FIG. 1H, and the voice object architecture of FIG. 1I can include comment fields where key word text strings can be stored as profiles to facilitate the archiving of the objects in a data base. For example, the IOCA image object 64 in FIG. 1F includes the image encoding and comment field 67 in which may be stored key words which characterize the image data 61. For example, the word "elephant" could have been included in the comment field 67. Then during the archiving process, the IOCA image object 64 could be processed in a manner similar to that for the processing of a graphics object having an embedded text string, as has been described above. Similarly, the GOCA graphics object 68 shown in FIG. 1H has a graphics encoding and comment field 77 wherein key words can be stored as profiles to facilitate the archiving of the graphics object. The key word for example "elephant" could have been incorporated in the comment field 77, and the graphics object 68 could have key word generation proceed in a manner similar to that which has been previously described for key word generation operating upon an embedded text string within the graph data 75. Still further, the voice object 69 shown in FIG. 1I includes a voice encoding and comment field 87 in which key words can be included to facilitate the archiving of the voice object. In the example given above, the word string "elephant" could have been incorporated in a comment field 87 and during archiving operations, the voice object 69 can be processed in a manner similar to that which has been described for the graphics object where key word generation is based upon the extraction of an embedded text string from the graphics data. The key word generated for the voice object 69 will be used to access the voice object from the data base.

In a similar manner, comment fields can be included in the data stream envelope itself, for example in the MO:DCA envelope of FIG. 1E, the object area descriptor and comment field 71. The comment field 71 can have key words for the objects contained in the MO:DCA envelope stored therein to facilitate archiving of the objects or the entire envelope.

Figure 4:
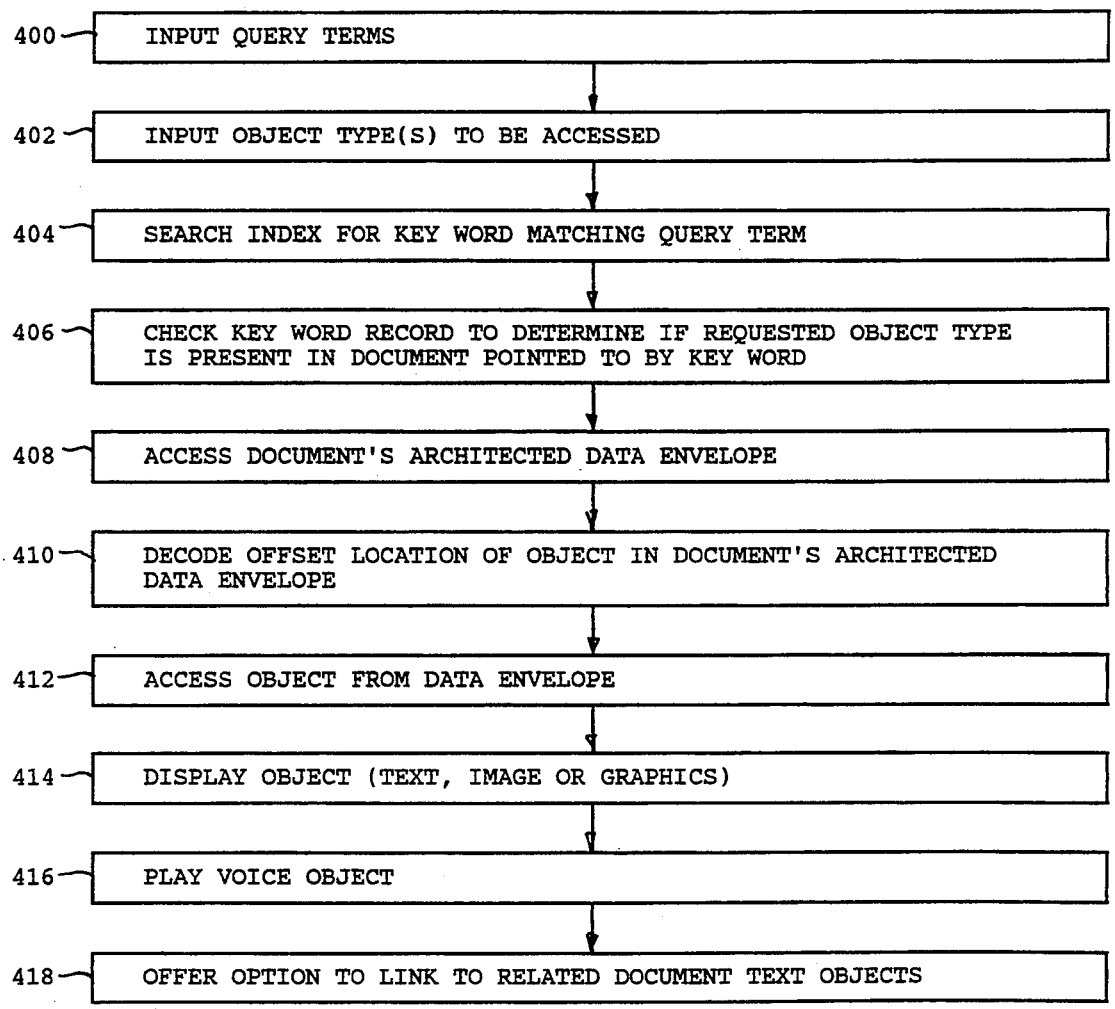
FIG. 4 is a flow diagram of the process of querying a data base containing documents having multiple objects, in accordance with the invention.

FIG. 4 is a flow diagram of a data base query process, in accordance with the invention, for use in independently accessing objects from archived documents in the data base. The flow starts at step 400 where query terms are input to the data base processor. In step 402, the user can introduce a profile of the type of objects which he wishes to access. An example of searching options profile menu for 90 is shown in FIG. 15, wherein the user may specify searching for text objects, image objects, graphics objects, voice objects, or other objects which have been archived in the data base. The use of such a specification enables the user to ignore those types of objects in which he has no interest and to concentrate on objects such as image objects, for example. In step 404, the index is searched for a key word matching the query term. Use may be made of morphological similarities between the query term and key words by means of the method described by Carlgren, et al., referenced above. In step 406, the key word record is checked when a match is found, to determine if the requested object type is present in the document pointed to by the key word. Then in step 408, the document's architected data envelope is accessed. Then in step 410, the offset location of the object is decoded so that the object can be independently extracted from the document's architected data envelope. Then in step 412, the desired object is accessed from the data envelope. Then in step 414, if the object is text, image or graphics, it is displayed on the user's display screen. In step 416, if the object is a voice object, it can be played on the user's voice interface. Then in step 418, the user may be offered the option, for example by pressing a function key, to link to a related text object in the document. This makes use of the text link field in each word occurrence entry to allow the user to display related text for the object that he is currently viewing. For example, the user may be viewing the bit mapped image I1 and by pressing the appropriate function key, the corresponding text link for the image I1 goes to line 19 which is the caption in the text object T2. The user can then scroll through the text object and through the rest of the document if he wishes, viewing both text objects and non-text objects in context, as desired.

FIG. 10 shows the workstation 500 for archiving and information retrieval. The workstation 500 includes a memory 520 in which is stored the multi-object type document archiving program of FIG. 3 at partition 511 and the multi-object type information retrieval program of FIG. 4 at partition 513, along with a suitable operating system program stored at partition 515. The memory 520 is connected by means of the bus 502 to the CPU 504, which executes the instructions in the programs represented by the flow diagrams of FIGS. 3, 4 and 12. The system may also include a coprocessor 506, if appropriate. The bus 502 is also connected to the DASD 508 which serves to store the data base of archived documents and the index for accessing those documents in the data base. Also connected to the bus 502 is the display and keyboard adapter 510 and the local area network interface 512 which connects the workstation 500 to a data processing network. Also connected to the bus 502 is a voice adapter 514 which can be connected to a suitable sound transducer for the purpose of playing back sound signals accessed from a document and for receiving sound signals, where appropriate. Also connected to the bus 502 is a mouse adapter 516 which serves as a pointer device to enable pointing in applications such as the highlighting of text as described above. The envelope partition 505 in the memory 520 serves to buffer the data stream envelope 65. The key word buffer 507 partition in the memory 520 serves to buffer the portion of the index 450 containing the key word, document segment and word occurrence entry which is currently of interest. The display buffer partition 509 of memory 520 will store the portion of the document which is currently being displayed on the display 510 of the workstation. In the example shown in FIG. 10, the graphics object G1 and the text object T4 are currently buffered in the display buffer.

FIG. 12 is a high level flow diagram which shows how the pseudocode tables are linked together for document archiving. In particular, step 460 shows the pseudocode of Table A for initializing and text object archiving. This flows to step 462 which is the pseudocode for Table B for image object archiving. This flows to step 464 which shows the pseudocode of Table C for graphics object archiving. This flows to step 466 which shows the pseudocode of Table I for voice object archiving. This flows to step 468 which shows the pseudocode of Table B for storing the document and the augmented index.

FIG. 16 shows an example of how the data for a voice object is related to the original sound signal. Depicted in FIG. 16 is a sample analog sound signal which may be digitized to yield the voice data 85. An analog sound signal is applied to a sampler which samples at a given frequency and produces a sequence of analog magnitudes which are each individually digitized producing the corresponding digital value. If the digital value remains proportional to the sampled magnitude, then the voice data 85 can be referred to as pulse code modulated. If consecutive differences are taken between consecutive digitized values for the sampled magnitudes, then a form of delta modulation can be used as the characteristic for the voice data 85. The digitized value of each sample of the sound signal is collectively referred to as the voice data 85 which is stored in the voice object 69 of FIG. 1I.

FIG. 17 shows how image data 61 can be produced from an image. As is shown in FIG. 17, an image is an array of picture elements which can either have a binary value for black and white representation, or can have one of a plurality of values for each picture element position for gray level depiction. Typical gray level ranges are from 0–7, 0–15 or 0–255. Shown in FIG. 17 is a binary representation of a picture where the black picture elements are represented as being fully black and white picture elements are represented as being fully white. In the conversion of the array of picture elements to a bit map array, each black element is given a binary value of one and each white picture element is given a binary value of zero, resulting in the array of ones and zeros shown in FIG. 17, which constitutes one form of the image data 61. The image data 61 can be fully compressed by run length encoding, Huffman encoding or other techniques to result in smaller data sets which can represent the image data 61. The image data 61 is then stored in a designated location of the image object 64 shown in FIG. 1F.

The resulting invention provides the advantage of enabling a user to query a data base containing documents having a variety of object types, and to independently access individual objects from the data base for display or manifestation. Still further, the invention facilitates the further accessing of related text objects for those non-text objects being reviewed by the user.

Although a specific embodiment of the invention has been disclosed, it will be understood by those having skill in the art that changes can be made to that specific embodiment without departing from the spirit and the scope of the invention.

TABLE A—PSEUDOCODE FOR INITIALIZING AND TEXT OBJECT ARCHIVING

Step 1202: Load existing index into index buffer (FIG. 5).

Step 1203: Load User's Archiving Options Profile (FIG. 14).

Step 1204: Input Document Architecture Envelope (FIG. 6) and assign it a storage address.

Step 1206: Extract Object Map from Envelope (FIG. 8).

Step 1208: Locate Text Object in Envelope; if there is no Text Object, then go to Step 1234.

Step 1209: If Text Archiving not selected, then go to Step 1234. If selected, Generate Key Words from Object Comment Field, Step 2400 (TABLE J).

Comment: Generate Key Word for Text Object from Text Object.

Step 1210: Extract word string from Text Object.

Step 1212: If word not present in existing index, open a new key word record in key word buffer.

Step 1214: If word present in existing index, load existing key word record into key word buffer.

Step 1216: If word not previously processed for this document, Increment Number of documents field of key word record.

Step 1218: If word not previously processed for this document, Open a new Document Segment in the key word record and enter document ID and its envelope storage address.

Step 1220: Increment number of occurrences of word in the document, in field of document segment.

Step 1222: Open a word occurrence entry in the document segment of the key word record and enter object type as Text Object.

Step 1224: Enter object offset (in envelope) into the word occurrence entry.

Comment: Link Key Word for Text Object with Text Object.

Step 1226: Enter word offset (in envelope) into Text Link field of the word occurrence entry.

Step 1228: If any more occurrences of word in Text Object, return to step 1220.

Step 1229: Merge key word record with existing index.

Step 1230: If any additional words in Text Object, return to step 1210.

Step 1232: If any more Text Objects in envelope, return to step 1208.

Step 1233: Go to Image Object Archiving Routine at Step 1234 (TABLE B).

TABLE B—PSEUDOCODE FOR IMAGE OBJECT ARCHIVING

Step 1234: Locate Image Object in Envelope. If there is no Image Object or If Image Archiving is not selected, then go to Step 1280.

Step 1235: If Manual key word entry is selected, then go to Step 1640 (TABLE E).

Step 1236: If Highlighted key word entry is selected, then go to Step 1740 (TABLE F). If selected, Generate Key Words from Object Comment Field, Step 2400 (TABLE J).

Step 1237: If Automatic Key Word Generation is selected, Determine from object map, which Text Object is adjacent to the Image Object in the document, else go to Step 1280.

Step 1238: Extract adjacent Text Object and search for caption text string.

Step 1239: If there is a caption text string in adjacent Text Object, then go to step 1240, else go to step 1261.

Comment: Generate Key Word for Image Object from Caption in Text Object.

Step 1240: Extract word string from caption in adjacent Text Object.

Step 1242: If word not present in existing index, open a new key word record in key word buffer.

Step 1244: If word present in existing index, load existing key word record into key word buffer.

Step 1246: If word not previously processed for this document, Increment Number of documents field of key word record.

Step 1248: If word not previously processed for this document, Open a new Document Segment in the key word record and enter document ID and its envelope storage address.

Step 1250: Increment number of occurrences of word in the document, in field of document segment.

Step 1252: Open a word occurrence entry in the document segment of the key word record and enter object type as Image Object.

Step 1254: Enter object offset of Image Object (in envelope) into the word occurrence entry.

Comment: Link Key Word for Image Object with Caption in Text Object.

Step 1256: Enter word offset (in envelope) of the word in the caption in the adjacent Text Object, into the Text Link field of the word occurrence entry.

Step 1258: If any more occurrences of word in caption text string of adjacent Text Object, return to step 1250.

Step 1259: Merge key word record with existing index.

Step 1260: If any additional words in caption text string of adjacent Text Object, return to step 1240.

Step 1261: If there is no caption text string in adjacent Text Object, then go to step 1262, else go to step 1275.

Comment: Generate Key Word for Image Object from Text Object.

Step 1262: Extract word string from adjacent Text Object.

Step 1263: If word not present in existing index, open a new key word record in key word buffer.

Step 1264: If word present in existing index, load existing key word record into key word buffer.

Step 1265: If word not previously processed for this document, Increment Number of documents field of key word record.

Step 1266: If word not previously processed for this document, Open a new Document Segment in the key word record and enter document ID and its envelope storage address.

Step 1267: Increment number of occurrences of word in the document, in field of document segment.

Step 1268: Open a word occurrence entry in the document segment of the key word record and enter object type as Image Object.

Step 1269: Enter object offset (in envelope) of the Image Object into the word occurrence entry.

Comment: Link Key Word for Image Object with Text Object.

Step 1270: Enter word offset (in envelope) of the word in the adjacent Text Object, into the Text Link field of the word occurrence entry.

Step 1271: If any more occurrences of word in adjacent Text Object, then return to step 1267.

Step 1272: Merge key word record with existing index.

Step 1273: If any additional words in adjacent Text Object, return to step 1262.

Step 1274: If any more Image Objects in envelope, return to step 1234.

Step 1275: Go to Graphics Object Archiving Routine at Step 1280 (TABLE C).

TABLE C—PSEUDOCODE FOR GRAPHICS OBJECT ARCHIVING

Step 1280: Locate Graphics Object in Envelope. If there is no Graphics Object or If graphics Archiving is not selected, then go to Step 1400.

Step 1281: If Manual key word entry is selected, then go to Step 1840 (TABLE G).

Step 1282: If Highlighted key word entry is selected, then go to Step 1940 (TABLE H). If selected, Generate Key Words from Object Comment Field, Step 2400 (TABLE J).

Step 1283: If Automatic key word Generation is selected, then Extract Graphics Data (FIG. 11) from Graphics Object in Envelope, else go to Step 1400.

Step 1284: Search for embedded text strings in Graphics Data.

Step 1285: If there is an embedded text string in Graphics Object, then go to step 1286, else go to step 1336.

Comment: Generate Key Word for Graphics Object from Embedded Text in Graphics Object.

Step 1286: Extract word string from embedded text in Graphics Object.

Step 1287: If word not present in existing index, open a new key word record in key word buffer.

Step 1288: If word present in existing index, load existing key word record into key word buffer.

Step 1289: If word not previously processed for this document, Increment Number of documents field of key word record.

Step 1290: If word not previously processed for this document, Open a new Document Segment in the key word record and enter document ID and its envelope storage address.

Step 1292: Increment number of occurrences of word in the document, in field of document segment.

Step 1292: Open a word occurrence entry in the document segment of the key word record and enter object type as Graphics Object.

Step 1293: Enter object offset of Graphics Object (in envelope) into the word occurrence entry.

Comment: Link Key Word (from Embedded Text) for Graphics Object with Text Object.

Step 1306: Determine from object map, which Text Object is adjacent to and Below the Graphics Object in the document.

Step 1308: Extract adjacent Text Object Below Graphics Object and search for the word from the embedded text found in the Graphics Object.

Step 1309: If the word is in the Below adjacent Text Object, then go to step 1312, else go to step 1314.

Step 1312: Enter word offset (in envelope) of the word in the Below adjacent Text Object, into the Text Link field of the word occurrence entry and then go to Step 1332.

Step 1314: Determine from object map, which Text Object is adjacent to and Above the Graphics Object in the document.

Step 1316: Extract adjacent Text Object Above Graphics Object and search for the word from the embedded text found in the Graphics Object.

Step 1318: If the word is in the Above adjacent Text Object, then go to step 1320, else go to step 1322.

Step 1320: Enter word offset (in envelope) of the word in the Above adjacent Text Object, into the Text Link field of the word occurrence entry and then go to Step 1332.

Step 1322: Determine from index, all Text Objects in the document containing the word from the embedded text found in Graphics Object.

Step 1324: If the word does not occur in any text object, enter a null into the text link field and go to Step 1332.

Step 1326: If the word is found in any Text Object, then go to step 1328, else go to step 1330.

Step 1328: Enter word offset (in envelope) of the word in the found Text Object, into the Text Link field of the word occurrence entry and then go to Step 1332.

Step 1330: Enter word offset (in envelope) of the first occurring word in the adjacent Text Object Below the Graphics Object, into the Text Link field of the word occurrence entry.

Step 1332: If any more occurrences of word in embedded text string of Graphics Object, return to step 1291.

Step 1334: Merge key word record with existing index.

Step 1335: If any additional words are in embedded text string of Graphics Object, return to step 1286 else go to step 1380.

Comment: Since there are No Embedded Text Strings in Graphics Object, Generate Key Word for Graphics Object from Text Object.

Step 1336: Determine from object map, which Text Object is adjacent to the Graphics Object in the document.

Step 1338: Extract adjacent Text Object and search for caption text string.

Step 1339: If there is a caption text string in adjacent Text Object, then go to step 1340, else go to step 1361.

Step 1340: Extract word string from caption in adjacent Text Object.

Step 1342: If word not present in existing index, open a new key word record in key word buffer.

Step 1344: If word present in existing index, load existing key word record into key word buffer.

Step 1346: If word not previously processed for this document, Increment Number of documents field of key word record.

Step 1348: If word not previously processed for this document, Open a new Document Segment in the key word record and enter document ID and its envelope storage address.

Step 1350: Increment number of occurrences of word in the document, in field of document segment.

Step 1352: Open a word occurrence entry in the document segment of the key word record and enter object type as Graphics Object.

Step 1354: Enter object offset of Graphics Object (in envelope) into the word occurrence entry.

Comment: Link Key Word for Graphics Object with Caption in Text Object.

Step 1356: Enter word offset (in envelope) of the word in the caption in the adjacent Text Object, into the Text Link field of the word occurrence entry.

Step 1358: If any more occurrences of word in caption text string of adjacent Text Object, return to step 1350.

Step 1359: Merge key word record with existing index.

Step 1360: If any additional words in caption text string of adjacent Text Object, return to step 1340.

Step 1361: If there is no caption text string in adjacent Text Object, then go to step 1362, else go to step 1380.

Comment: Since there is No Caption for Graphics Object in the Adjacent Text Object, then Generate Key Word for Graphics Object from Adjacent Text Object.

Step 1362: Extract word string from adjacent Text Object.

Step 1363: If word not present in existing index, open a new key word record in key word buffer.

Step 1364: If word present in existing index, load existing key word record into key word buffer.

Step 1366: If word not previously processed for this document, Increment Number of documents field of key word record.

Step 1368: If word not previously processed for this document, Open a new Document Segment in the key word record and enter document ID and its envelope storage address.

Step 1370: Increment number of occurrences of word in the document, in field of document segment.

Step 1372: Open a word occurrence entry in the document segment of the key word record and enter object type as Graphics Object.

Step 1374: Enter object offset (in envelope) of the Graphics Object into the word occurrence entry.

Comment: Link Key Word for Graphics Object with Adjacent Text Object.

Step 1375: Enter word offset (in envelope) of the word in the adjacent Text Object, into the Text Link field of the word occurrence entry.

Step 1376: If any more occurrences of word in adjacent Text Object, then return to step 1370.

Step 1377: Merge key word record with existing index.

Step 1379: If any additional words in adjacent Text Object, return to step 1362.

Step 1380: If any more Graphics Objects in envelope, return to step 1280.

Step 1382: If any more objects in envelope to archive, then go to Step 1208, Else go to Step 2200 of TABLE I for Voice Object Routine.

TABLE D—PSEUDOCODE FOR STORING DOCUMENT AND AUGMENTED INDEX

Step 1400: Store Document Architecture Envelope at its assigned storage address.

Step 1402: If any more documents to archive, go to Step 1204.

Step 1402: Store Augmented Index with merged key word records.

Step 1404: RETURN.

TABLE E—PSEUDOCODE FOR MANUAL KEY WORD ENTRY FOR IMAGE OBJECT

Step 1640: Input word string from keyboard, as key word for Image Object.

Step 1642: If word not present in existing index, open a new key word record in key word buffer.

Step 1644: If word present in existing index, load existing key word record into key word buffer.

Step 1646: If word not previously processed for this document, Increment Number of documents field of key word record.

Step 1648: If word not previously processed for this document, Open a new Document Segment in the key word record and enter document ID and its envelope storage address.

Step 1650: Increment number of occurrences of word in the document, in field of document segment.

Step 1652: Open a word occurrence entry in the document segment of the key word record and enter object type as Image Object.

Step 1654: Enter object offset of Image Object (in envelope) into the word occurrence entry.

Comment: Link Key Word for Image Object with Designated Text Object.

Step 1655: Input designation of Text Object for linkage with word, using keyboard or mouse (default is adjacent Text Object).

Step 1656: Enter word offset (in envelope) of the designated Text Object, into the Text Link field of the word occurrence entry.

Step 1659: Merge key word record with existing index and RETURN.

TABLE F—PSEUDOCODE FOR HIGHLIGHTED KEY WORD ENTRY FOR IMAGE OBJECT

Step 1740: Input highlighting for selected word string in selected Text Object, as key word for Image Object, using keyboard or mouse.
Step 1742: If word not present in existing index, open a new key word record in key word buffer.
Step 1744: If word present in existing index, load existing key word record into key word buffer.
Step 1746: If word not previously processed for this document, Increment Number of documents field of key word record.
Step 1748: If word not previously processed for this document, Open a new Document Segment in the key word record and enter document ID and its envelope storage address.
Step 1750: Increment number of occurrences of word in the document, in field of document segment.
Step 1752: Open a word occurrence entry in the document segment of the key word record and enter object type as Image Object.
Step 1754: Enter object offset of Image Object (in envelope) into the word occurrence entry.
Comment: Link Key Word for Image Object with Highlighted Text Object.
Step 1756: Enter word offset (in envelope) of the highlighted word in Text Object, into the Text Link field of the word occurrence entry.
Step 1759: Merge key word record with existing index and RETURN.

TABLE G—PSEUDOCODE FOR MANUAL KEY WORD ENTRY FOR GRAPHICS OBJECT

Step 1840: Input word string from keyboard, as key word for Graphics Object.
Step 1842: If word not present in existing index, open a new key word record in key word buffer.
Step 1844: If word present in existing index, load existing key word record into key word buffer.
Step 1846: If word not previously processed for this document, Increment Number of documents field of key word record.
Step 1848: If word not previously processed for this document, Open a new Document Segment in the key word record and enter document ID and its envelope storage address.
Step 1850: Increment number of occurrences of word in the document, in field of document segment.
Step 1852: Open a word occurrence entry in the document segment of the key word record and enter object type as Graphics Object.
Step 1854: Enter object offset of Graphics Object (in envelope) into the word occurrence entry.
Comment: Link Key Word for Graphics Object with Designated Text Object.
Step 1855: Input designation of Text Object for linkage with word, using keyboard or mouse (default is adjacent Text Object).
Step 1856: Enter word offset (in envelope) of the designated Text Object, into the Text Link field of the word occurrence entry.
Step 1859: Merge key word record with existing index and RETURN.

TABLE H—PSEUDOCODE FOR HIGHLIGHTED KEY WORD ENTRY FOR GRAPHICS OBJECT

Step 1940: Input highlighting for selected word string in selected Text Object, as key word for Graphics Object, using keyboard or mouse.
Step 1942: If word not present in existing index, open a new key word record in key word buffer.
Step 1944: If word present in existing index, load existing key word record into key word buffer.
Step 1946: If word not previously processed for this document, Increment Number of documents field of key word record.
Step 1948: If word not previously processed for this document, Open a new Document Segment in the key word record and enter document ID and its envelope storage address.
Step 1950: Increment number of occurrences of word in the document, in field of document segment.
Step 1952: Open a word occurrence entry in the document segment of the key word record and enter object type as Graphics Object.
Step 1954: Enter object offset of Graphics Object (in envelope) into the word occurrence entry.
Comment: Link Key Word for Graphics Object with Highlighted Text Object.
Step 1956: Enter word offset (in envelope) of the highlighted word in Text Object, into the Text Link field of the word occurrence entry.
Step 1959: Merge key word record with existing index and RETURN.

TABLE I—PSEUDOCODE FOR VOICE OBJECT ARCHIVING

Step 2200: Locate Voice Object in Envelope. If there is no Voice Object or If Voice Archiving is not selected, then go to Step 2280.
Step 2235: If Manual key word entry is selected, then go to Step 1640 (TABLE E).
Step 2236: If Highlighted key word entry is selected, then go to Step 1740 (TABLE F). If selected, Generate Key Words from Object Comment Field, Step 2400 (TABLE J).
Step 2237: If Automatic key word Generation is selected, Determine from object map, which Text Object is related to the Voice Object in the document, else go to Step 2280.
Step 2238: Extract Text Object and search for caption text string.
Step 2239: If there is a caption text string in Text Object, then go to step 2240, else go to step 2261.
Comment: Generate Key Word for Voice Object from Caption in Text Object.
Step 2240: Extract word string from caption in Text Object.
Step 2242: If word not present in existing index, open a new key word record in key word buffer.
Step 2244: If word present in existing index, load existing key word record into key word buffer.
Step 2246: If word not previously processed for this document, Increment Number of documents field of key word record.
Step 2248: If word not previously processed for this document, Open a new Document Segment in the key word record and enter document ID and its envelope storage address.
Step 2250: Increment number of occurrences of word in the document, in field of document segment.

Step 2252: Open a word occurrence entry in the document segment of the key word record and enter object type as Voice Object.
Step 2254: Enter object offset of Voice Object (in envelope) into the word occurrence entry.
Comment: Link Key Word for Voice Object with Caption in Text Object.
Step 2256: Enter word offset (in envelope) of the word in the caption in the Text Object, into the Text Link field of the word occurrence entry.
Step 2258: If any more occurrences of word in caption text string of Text Object, return to step 2250.
Step 2259: Merge key word record with existing index.
Step 2260: If any additional words in caption text string of Text Object, return to step 2240.
Step 2261: If there is no caption text string in Text Object, then go to step 2262, else go to step 2275.
Comment: Generate Key Word for Voice Object from Text Object.
Step 2262: Extract word string from Text Object.
Step 2263: If word not present in existing index, open a new key word record in key word buffer.
Step 2264: If word present in existing index, load existing key word record into key word buffer.
Step 2265: If word not previously processed for this document, Increment Number of documents field of key word record.
Step 2266: If word not previously processed for this document, Open a new Document Segment in the key word record and enter document ID and its envelope storage address.
Step 2267: Increment number of occurrences of word in the document, in field of document segment.
Step 2268: Open a word occurrence entry in the document segment of the key word record and enter object type as Voice Object.
Step 2269: Enter object offset (in envelope) of the Voice Object into the word occurrence entry.
Comment: Link Key Word for Voice Object with Text Object.
Step 2270: Enter word offset (in envelope) of the word in the Text Object, into the Text Link field of the word occurrence entry.
Step 2271: If any more occurrences of word in Text Object, then return to step 2267.
Step 2272: Merge key word record with existing index.
Step 2273: If any additional words in Text Object, return to step 2262.
Step 2274: If any more Voice Objects in envelope, return to step 2200.
Step 2275: Go to Document Storage Routine at Step 1400 (TABLE D).

TABLE J—PSEUDOCODE FOR OBJECT ARCHIVING USING OBJECT COMMENT FIELD

Step 2400: Extract Data from Object Commend Field in Object. If there is no Data in the comment field, then RETURN.
Step 2484: Search for embedded text strings in Comment Data.
Step 2485: If there is an embedded text string in Comment Data, then RETURN.
Comment: Generate Key Word for Object from Embedded Text in Object Comment Field.
Step 2486: Extract word string from embedded text in Comment Data.
Step 2487: If word not present in existing index, open a new key word record in key word buffer.
Step 2488: If word present in existing index, load existing key word record into key word buffer.
Step 2489: If word not previously processed for this document, Increment Number of documents field of key word record.
Step 2490: If word not previously processed for this document, Open a new Document Segment in the key word record and enter document ID and its envelope storage address.
Step 2491: Increment number of occurrences of word in the document, in field of document segment.
Step 2492: Open a word occurrence entry in the document segment of the key word record and enter object type as the current Object type.
Step 2493: Enter object offset of the Object (in envelope) into the word occurrence entry.
Step 2495: RETURN.

I claim:

1. In a data processing system, a method for archiving image objects in a document, comprising the steps of:
   loading an existing index into a data processing system;
   inputting a document architecture envelope including a text object and substantially adjacent image object into said system;
   generating a first key word for said text object from said text object and adding said first key word to said index;
   automatically determining that said text object is substantially adjacent to said substantially adjacent image object and in response thereto, generating a second key word for said substantially adjacent image object from said text object and adding said second key word to said index;
   storing said document architecture envelope in said system;
   storing said index including said first and second key words in said system;
   entering a search term into said data processing system;
   comparing said search term with candidate key words in said index; and
   retrieving said substantially adjacent image object if said second key word is found in said comparing step.

2. The method of claim 1, wherein said second key word is generated from a caption word string in said text object.

3. The method of claim 1, wherein said second key word is generated from highlighting a word string in said text object.

4. The method of claim 1, wherein said second key word is generated from typing a word string into said system.

5. In a data processing system, a method for archiving graphics objects in a document, comprising the steps of:
   loading an existing index into a data processing system;
   inputting a document architecture envelope including a text object and a graphics object containing embedded text into said system;
   generating a first key word for said text object from said text object, and adding said first key word to said index;
   automatically determining if there is embedded text in said graphics object, and in response thereto, extracting graphics data including embedded text from said graphics object;
generating a second key word for said graphics object from said embedded text and adding said second key word to said index;
storing said document architecture envelope in said system;
storing said index including said first and second key words in said system;
entering a search term into said data processing system;
comparing said search term with candidate key words in said index; and
retrieving said graphics object if said second key word is found in said comparing step.

6. The method of claim 5, which further comprises:
generating a third key word for said graphics object from a caption word string in said text object and adding said third key word to said index;
storing said index including said first, second and third key words in said system.

7. The method of claim 5, which further comprises:
generating a third key word for said graphics object from highlighting a word string in said text object and adding said third key word to said index;
storing said index including said first, second and third key words in said system.

8. The method of claim 5, which further comprises:
generating a third key word for said graphics object from typing a word string into said system and adding said third key word to said index;
storing said index including said first, second and third key words in said system.

9. In a data processing system, a method for archiving image objects and graphics objects in a document, comprising the steps of:
loading an existing index into a data processing system;
inputting a document architecture envelope including a text object, an image object and a graphics object into said system;
generating a first key word for said text object from said text object and adding said first key word to said index;
automatically generating a second key word for said image object from said text object and adding said second key word to said index;
extracting graphics data including embedded text from said graphics object;
generating a third key word for said graphics object from said embedded text and adding said third key word to said index;
storing said document architecture envelope in said system;
storing said index including said first, second and third key words in said system;
entering a search term into said data processing system;
comparing said search term with candidate key words in said index; and
retrieving said image object if said second key word is found in said comparing step.

10. The method of claim 9, wherein said second key word is generated from a caption word string in said text object.

11. The method of claim 9, wherein said second key word is generated from highlighting a word string in said text object.

12. The method of claim 9, wherein said second key word is generated from typing a word string into said system.

13. The method of claim 9, which further comprises:
generating a fourth key word for said graphics object from a caption word string in said text object and adding said fourth key word to said index;
storing said index including said first, second, third and fourth key words in said system.

14. The method of claim 9, which further comprises:
generating a fourth key word for said graphics object from highlighting a word string in said text object and adding said fourth key word to said index;
storing said index including said first, second, third and fourth key words in said system.

15. The method of claim 9, which further comprises:
generating a fourth key word for said graphics object from typing a word string into said system and adding said fourth key word to said index;
storing said index including said first, second, third and fourth key words in said system.

16. In a data processing system, a method for archiving non-text objects in a document, comprising the steps of:
loading an existing index into a data processing system;
inputting a document architecture envelope including a non-text object and comment text into said system;
automatically generating a first key word for said non-text object from said comment text and adding said first key word to said index;
storing said document architecture envelope in said system;
storing said index including said first key word in said system;
entering a search term into said data processing system;
comparing said search term with candidate key words in said index; and
retrieving said non-text object if said first key word is found in said comparing step.

17. The method of claim 16, wherein said first key word is generated from comment text contained in said non-text object.

18. The method of claim 16, wherein said first key word is generated from displaying and highlighting a word string in said comment text.

19. The method of claim 16, wherein said first key word is generated from typing a word string into said system.

20. In a data processing system, a method for archiving graphics objects in a document, comprising the steps of:
loading an existing index into a data processing system;
inputting a document architecture envelope including a graphics object containing embedded text into said system;
extracting graphics data including embedded text from said graphics object;
automatically determining if there is embedded text in said graphics object and in response thereto, generating a first key word for said graphics object from said embedded text and adding said first key word to said index;
storing said document architecture envelope in said system;

storing said index including said first key word in said system;

entering a search term into said data processing system;

comparing said search term with candidate key words in said index; and retrieving said graphics object if said first key word is found in said comparing step.

21. The method of claim 20, which further comprises:

generating a second key word for said graphics object from a caption word string in a text object in said document and adding said second key word to said index;

storing said index including said first and second key words in said system.

22. The method of claim 20, which further comprises:

generating a second key word for said graphics object from highlighting a word string in a text object in said document and adding said second key word to said index;

storing said index including said first and second key words in said system.

23. The method of claim 20, which further comprises:

generating a second key word for said graphics object from typing a word string into said system and adding said second key word to said index;

storing said index including said first and second key words in said system.

24. In a data processing system, a method for archiving image objects in a document, comprising the steps of:

loading an existing index into a data processing system;

inputting a document architecture envelope including an image object and a substantially adjacent text object into said system;

automatically determining if there is a text object substantially adjacent to said image object, and in response thereto, generating a first key word for said image object from said text object;

generating a link for said first key word to said text object;

adding said first key word and said link to said index;

storing said document architecture envelope in said system;

storing said index including said first key word in said system;

entering a search term into said data processing system;

comparing said search term with candidate key words in said index; and retrieving said image object if said first key word is found in said comparing step.

25. The method of claim 24, wherein said first key word is generated from a caption word string in said text object.

26. The method of claim 24, wherein said first key word is generated from highlighting a word string in said text object.

27. The method of claim 24, wherein said first key word is generated from typing a word string into said system.

28. In a data processing system, a method for archiving graphics objects in a document, comprising the steps of:

loading an existing index into a data processing system;

inputting a document architecture envelope including a graphics object and a text object into said system;

extracting graphics data including embedded text from said graphics object;

automatically generating a first key word for said graphics object from said embedded text;

generating a link for said first key word to said text object;

adding said first key word and said link to said index;

storing said document architecture envelope in said system;

storing said index including said first key word in said system;

entering a search term into said data processing system;

comparing said search term with candidate key words in said index; and retrieving said graphics object if said first key word is found in said comparing step.

29. The method of claim 28, which further comprises:

generating a second key word for said graphics object from a caption word string in said text object;

generating a second link for said second key word to said text object;

adding said second key word to said index;

storing said index including said first and second key words in said system.

30. The method of claim 28, which further comprises:

generating a second key word for said graphics object from highlighting a word string in said text object;

generating a second link for said second key word to said text object;

adding said second key word to said index;

storing said index including said first and second key words in said system.

31. The method of claim 28, which further comprises:

generating a second key word for said graphics object from typing a word string into said system;

generating a second link for said second key word to said text object;

adding said second key word to said index;

storing said index including said first and second key words in said system.

32. A data processing system for archiving image objects in a document, comprising:

means for loading an existing index into a data processing system;

means for inputting a document architecture envelope including a text object and an image object into said system;

means coupled to said loading means and said inputting means for generating a first key word for said text object from said text object and adding said first key word to said index;

said generating means automatically generating a second key word for said image object from said text object and adding said second key word to said index;

means coupled to said inputting means for storing said document architecture envelope in said system;

means coupled to said generating means for storing said index including said first and second key words in said system;

means for entering a search term into said data processing system;

means for comparing said search term with candidate key words in said index; and means for retrieving said image object if said second key word is found in said means for comparing.

33. The system of claim 32, wherein said second key word is generated from a caption word string in said text object.

34. The system of claim 32, wherein said second key word is generated from highlighting a word string in said text object.

35. The system of claim 32, wherein said second key word is generated from typing a word string into said system.

36. A data processing system for archiving graphics objects in a document, comprising:

means for loading an existing index into a data processing system;

means for inputting a document architecture envelope including a text object and a graphics object into said system;

first generating means coupled to said loading means and said inputting means for generating a first key word for said text object from said text object and adding said first key word to said index;

means coupled to said loading means and said inputting means for extracting graphics data including embedded text from said graphics object;

second generating means coupled to said extracting means for automatically generating a second key word for said graphics object from said embedded text and adding said second key word to said index;

means coupled to said inputting means for storing said document architecture envelope in said system;

means coupled to said first and said second generating means for storing said index including said first and second key words in said system;

means for entering a search term into said data processing system;

means for comparing said search term with candidate key words in said index; and means for retrieving said graphics object if said second key word is found in said means for comparing.

37. The system of claim 36, which further comprises:

said first generating means generating a third key word for said graphics object from a caption word string in said text object and adding said third key word to said index;

said index including said first, second and third key words in said system.

38. The system of claim 36, which further comprises:

third generating means coupled to said loading means and said inputting means for generating a third key word for said graphics object from highlighting a word string in said text object and adding said third key word to said index;

said index including said first, second and third key words in said system.

39. The system of claim 36, which further comprises:

third generating means coupled to said loading means and said inputting means for generating a third key word for said graphics object from typing a word string into said system and adding said third key word to said index;

said index including said first, second and third key words in said system.

40. In a data processing system, a method for archiving image objects in a document, comprising the steps of:

loading an existing index into a data processing system;

inputting an image object file into said system;

inputting a document architecture envelope including a text object and a pointer to said image object file, into said system;

automatically generating a first key word for said image object from said text object;

generating a link for said first key word to said text object;

adding said first key word and said link to said index;

storing said document architecture envelope and said image object file in said system;

storing said index including said first key word in said system;

entering a search term into said data processing system;

comparing said search term with candidate key words in said index; and retrieving said image object if said first key word, is found in said comparing step.

41. The method of claim 40, wherein said first key word is generated from a caption word string in said text object.

42. The method of claim 40, wherein said first key word is generated from highlighting a word string in said text object.

43. The method of claim 40, wherein said first key word is generated from typing a word string into said system.

44. In a data processing system, a method for archiving graphics objects in a document, comprising the steps of:

loading an existing index into a data processing system;

inputting a graphics object file into said system;

inputting a document architecture envelope including a text object and a pointer to said graphics object file into said system;

extracting graphics data including embedded text from said graphics object;

automatically generating a first key word for said graphics object from said embedded text;

generating a link for said first key word to said text object;

adding said first key word and said link to said index;

storing said document architecture envelope and said graphics object file in said system;

storing said index including said first key word in said system;

entering a search term into said data processing system;

comparing said search term with candidate key words in said index; and retrieving said graphics object if said first key word is found in said comparing step.

45. The method of claim 44, which further comprises:

generating a second key word for said graphics object from a caption word string in said text object;

generating a second link for said second key word to said text object;

adding said second key word to said index;

storing said index including said first and second key words in said system.

46. The method of claim 44, which further comprises:

generating a second key word for said graphics object from highlighting a word string in said text object;
generating a second link for said second key word to said text object;
adding said second key word to said index;
storing said index including said first and second key words in said system.

47. The method of claim 44, which further comprises:
generating a second key word for said graphics object from typing a word string into said system;
generating a second link for said second key word to said text object;
adding said second key word to said index;
storing said index including said first and second key words in said system.

48. In a data processing system, a method for archiving voice objects in a document, comprising the steps of:
loading an existing index into a data processing system;
inputting a document architecture envelope including a text object and an voice object into said system;
generating a first key word for said text object from said text object and adding said first key word to said index;
automatically generating a second key word for said voice object from said text object and adding said second key word to said index;
storing said document architecture envelope in said system;
storing said index including said first and second key words in said system;
entering a search term into said data processing system;
comparing said search term with candidate key words in said index; and
retrieving said voice object if said second key word is found in said comparing step.

49. The method of claim 48, wherein said second key word is generated from a caption word string in said text object.

50. The method of claim 48, wherein said second key word is generated from highlighting a word string in said text object.

51. The method of claim 48, wherein said second key word is generated from typing a word string into said system.

52. In a data processing system, a method for archiving voice objects in a document, comprising the steps of:
loading an exiting index into a data processing system;
inputting a document architecture envelope including an voice object into said system;
automatically generating a first key word for said voice object from a text object in said document and adding said first key word to said index;
storing said document architecture envelope in said system;
storing said index including said first key word in said system;
entering a search term into said data processing system;
comparing said search term with candidate key words in said index; and
retrieving said voice object if said first key word is found in said comparing step.

53. The method of claim 52, wherein said first key word is generated from a caption word string in said text object.

54. The method of claim 52, wherein said first key word is generated from highlighting a word string in said text object.

55. The method of claim 52, wherein said first key word is generated from typing a word string into said system.

56. In a data processing system, a method for archiving voice objects in a document, comprising the steps of:
loading an existing index into a data processing system;
inputting a document architecture envelope including an voice object and a text object into said system;
automatically generating a first key word for said voice object from said text object;
automatically generating a link for said first key word to said text object;
adding said first key word and said link to said index;
storing said document architecture envelope in said system;
storing said index including said first key word in said system;
entering a search term into said data processing system;
comparing said search term with candidate key words in said index; and
retrieving said voice object if said first key word is found in said comparing step.

57. The method of claim 56, wherein said first key word is generated from a caption word string in said text object.

58. The method of claim 56, wherein said first key word is generated from highlighting a word string in said text object.

59. The method of claim 56, wherein said first key word is generated from typing a word string into said system.

60. A data processing system for archiving voice objects in a document, comprising:
means for loading an existing index into a data processing system;
means for inputting a document architecture envelope including a text object and an voice object into said system;
means coupled to said loading means and said inputting means for generating a first key word for said text object from said text object and adding said first key word to said index;
said generating means automatically generating a second key word for said voice object from said text object and adding said second key word to said index;
means coupled to said inputting means for storing said document architecture envelope in said system;
means coupled to said generating means for storing said index including said first and second key words in said system;
means for entering a search term into said data processing system;
means for comparing said search term with candidate key words in said index; and means for retrieving said voice object if said second key word is found in said means for comparing.

61. The system of claim 60, wherein said second key word is generated from a caption word string in said text object.

62. The system of claim 60, wherein said second key word is generated from highlighting a word string in said text object.

63. The system of claim 60, wherein said second key word is generated from typing a word string into said system.

64. In a data processing system, a method for archiving non-text objects in a document, comprising the steps of:
  loading an existing index into a data processing system;
  inputting a document architecture envelope including a non-text object and containing embedded text into said system;
  extracting said embedded text;
  automatically generating a first key word for said non-text object from said embedded text and adding said first key word to said index;
  storing said document architecture envelope in said system;
  storing said index including said first key word in said system;
  entering a search term into said data processing system;
  comparing said search term with candidate key words in said index; and
  retrieving said non-text object if said first key word is found in said comparing step.

65. The method of claim 64, wherein non-text object is a graphics object.

66. The method of claim 64, wherein said non-text object is a formatted data object.

67. The method of claim 64, wherein at least a portion of said non-text object is a separate file which is referenced by a pointer in said envelope.

68. In a data processing system, a method for archiving non-text objects in a document, comprising the steps of:
  loading an existing index into a data processing system;
  inputting a document architecture envelope including an non-text object into said system;
  automatically generating a first key word for said non-text object from a text object in said document and adding said first key word to said index;
  storing said document architecture envelope in said system;
  storing said index including said first key word in said system;
  entering a search term into said data processing system;
  comparing said search term with candidate key words in said index; and
  retrieving said non-text object if said first key word is found in said comparing step.

69. The method of claim 68, wherein said first key word is generated from a caption word string in said text object.

70. The method of claim 68, wherein said first key word is generated from highlighting a word string in said text object.

71. The method of claim 68, wherein said first key word is generated from typing a word string into said system.

72. In a data processing system, a method for archiving non-text objects in a document, comprising the steps of:
  loading an existing index into a data processing system;
  inputting a document architecture envelope including an non-text object and a text object into said system;
  automatically generating a first key word for said non-text object from said text object;
  generating a link for said first key word to said text object;
  adding said first key word and said link to said index;
  storing said document architecture envelope in said system;
  storing said index including said first key word in said system;
  entering a search term into said data processing system;
  comparing said search term with candidate key words in said index; and
  retrieving said non-text object if said first key word is found in said comparing step.

73. The method of claim 72, wherein said first key word is generated from a caption word string in said text object.

74. The method of claim 72, wherein said first key word is generated from highlighting a word string in said text object.

75. The method of claim 72, wherein said first key word is generated from typing a word string into said system.

76. A data processing system for archiving non-text objects in a document, comprising:
  means for loading an existing index into a data processing system;
  means for inputting a document architecture envelope including a text object and an non-text object into said system;
  means coupled to said loading means and said inputting means for generating a first key word for said text object from said text object and adding said first key word to said index;
  said generating means automatically generating a second key word for said non-text object from said text object and adding said second key word to said index;
  means coupled to said inputting means for storing said document architecture envelope in said system;
  means coupled to said generating means for storing said index including said first and second key words in said system;
  means for entering a search term into said data processing system;
  means for comparing said search term with candidate key words in said index; and
  means for retrieving said non-text object if said second key word is found in said means for comparing.

77. The system of claim 76, wherein said second key word is generated from a caption word string in said text object.

78. The system of claim 76, wherein said second key word is generated from highlighting a word string in said text object.

79. The system of claim 76, wherein said second key word is generated from typing a word string into said system.

* * * * *